(12) United States Patent
Akiyama

(10) Patent No.: US 9,134,801 B2
(45) Date of Patent: Sep. 15, 2015

(54) DISPLAY METHOD AND INFORMATION PROCESSING DEVICE

(71) Applicant: FUJITSU LIMITED, Kawasaki-shi, Kanagawa (JP)

(72) Inventor: Katsuhiko Akiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 127 days.

(21) Appl. No.: 13/910,546

(22) Filed: Jun. 5, 2013

(65) Prior Publication Data

US 2014/0007021 A1 Jan. 2, 2014

(30) Foreign Application Priority Data

Jul. 2, 2012 (JP) ................................. 2012-148817

(51) Int. Cl.
*G06F 3/048* (2013.01)
*G06F 3/01* (2006.01)
*G06F 3/0486* (2013.01)
*G06F 3/0488* (2013.01)

(52) U.S. Cl.
CPC .............. *G06F 3/017* (2013.01); *G06F 3/0486* (2013.01); *G06F 3/04883* (2013.01); *G06F 2203/04806* (2013.01)

(58) Field of Classification Search
CPC ... G06F 3/017; G06F 3/0486; G06F 3/04883; G06F 2203/04806
See application file for complete search history.

(56) References Cited

U.S. PATENT DOCUMENTS

| | | | |
|---|---|---|---|
| 5,861,583 A | 1/1999 | Schediwy et al. | |
| 6,590,568 B1 * | 7/2003 | Astala et al. | 345/173 |
| 8,184,093 B2 * | 5/2012 | Tsuiki | 345/156 |
| 8,477,115 B2 * | 7/2013 | Rekimoto | 345/174 |
| 8,508,487 B2 * | 8/2013 | Schwesig et al. | 345/173 |
| 8,539,385 B2 * | 9/2013 | Capela et al. | 715/863 |
| 8,780,069 B2 * | 7/2014 | Victor | 345/173 |
| 8,786,548 B2 * | 7/2014 | Oh et al. | 345/160 |
| 8,793,607 B2 * | 7/2014 | Jeong et al. | 715/769 |
| 8,832,605 B2 * | 9/2014 | Choi | 715/863 |
| 8,836,645 B2 * | 9/2014 | Hoover | 345/173 |
| 8,854,317 B2 * | 10/2014 | Homma et al. | 345/173 |
| 8,854,325 B2 * | 10/2014 | Byrd et al. | 345/173 |
| 8,875,046 B2 * | 10/2014 | Jitkoff | 715/786 |
| 8,881,050 B2 * | 11/2014 | Kim et al. | 715/784 |

(Continued)

FOREIGN PATENT DOCUMENTS

| | | |
|---|---|---|
| EP | 2 309 370 A2 | 4/2011 |
| EP | 2 482 179 A2 | 8/2012 |

(Continued)

OTHER PUBLICATIONS

Extended European Search Report issued Jan. 14, 2015 in corresponding European Patent Application No. 13169167.7.

*Primary Examiner* — David Phantana Angkool
(74) *Attorney, Agent, or Firm* — Staas & Halsey LLP

(57) ABSTRACT

A display method executed by a computer, includes: receiving a first input relating to a first operation performed on a display content displayed in a display unit; receiving a second input relating to a second operation performed on the display content; and when the second input received after the first input is a drag operation, changing a display scaling factor of the display content on the basis of a movement direction of the drag operation and a distance between a reference position relating to at least one of the first input and the second input, and a current position of the drag operation.

26 Claims, 13 Drawing Sheets

(56) References Cited

U.S. PATENT DOCUMENTS

| | | | |
|---|---|---|---|
| 8,881,062 B2* | 11/2014 | Kim et al. | 715/835 |
| 8,904,303 B2* | 12/2014 | Chang et al. | 715/773 |
| 8,922,494 B2* | 12/2014 | Min et al. | 345/173 |
| 8,928,612 B2* | 1/2015 | Lee | 345/173 |
| 8,928,618 B2* | 1/2015 | Hotelling et al. | 345/173 |
| 2008/0129759 A1 | 6/2008 | Jeon et al. | |
| 2011/0185321 A1* | 7/2011 | Capela et al. | 715/863 |
| 2011/0304584 A1 | 12/2011 | Hwang | |
| 2012/0127107 A1 | 5/2012 | Miyashita et al. | |

FOREIGN PATENT DOCUMENTS

| | | |
|---|---|---|
| JP | 11-506559 | 6/1999 |
| JP | 2005-234199 | 9/2005 |
| JP | 2011-22851 | 2/2011 |
| JP | 2011-28635 | 2/2011 |
| WO | 2007/089766 A2 | 8/2007 |

* cited by examiner

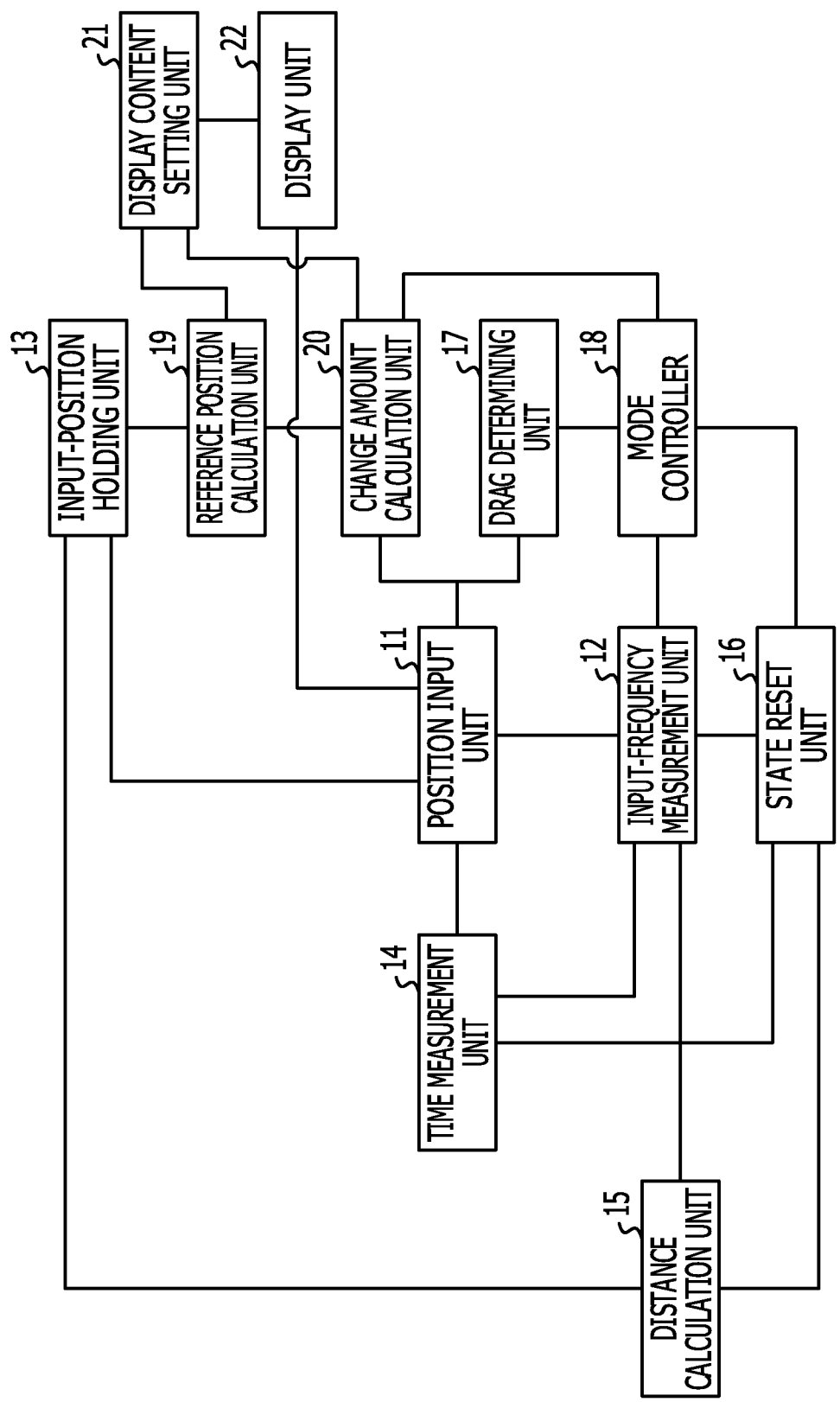

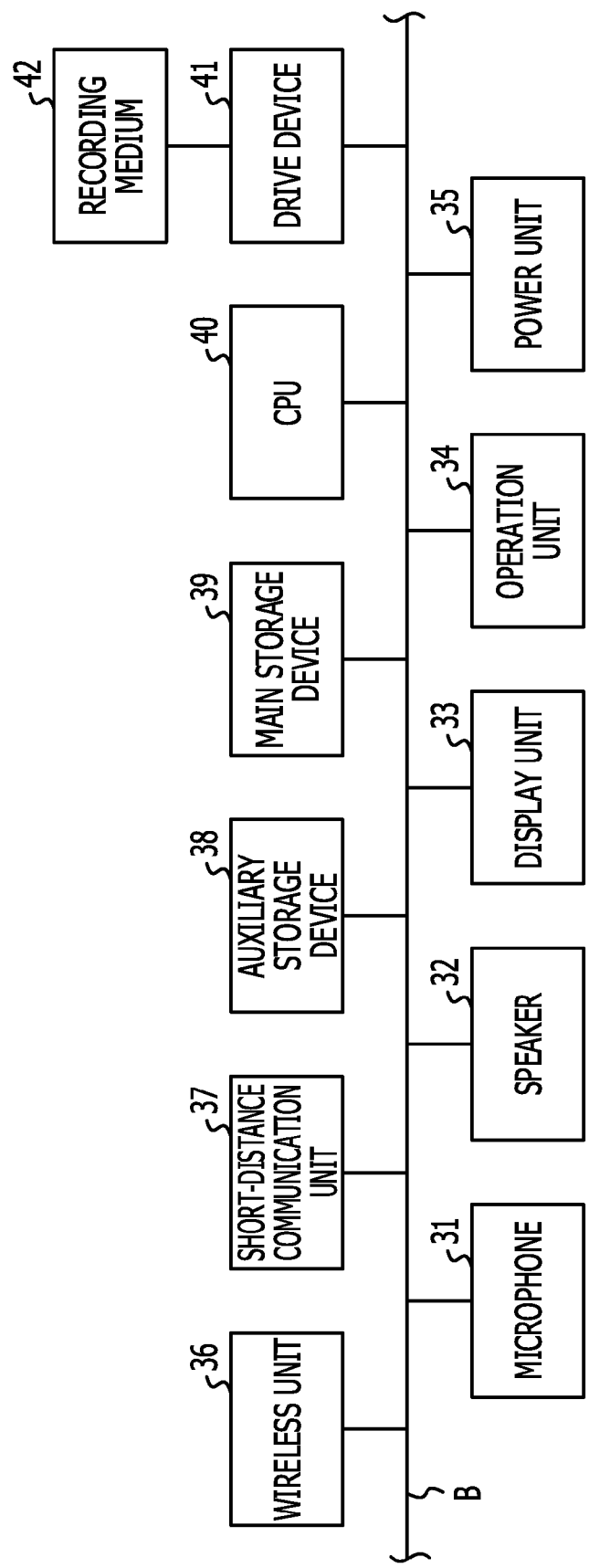

FIG. 7A
FIG. 7B
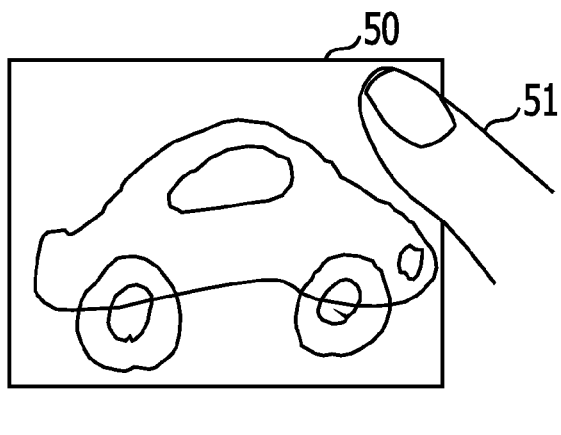
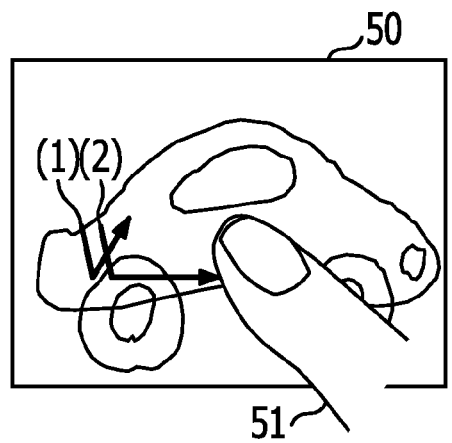
FIG. 7C
FIG. 7D
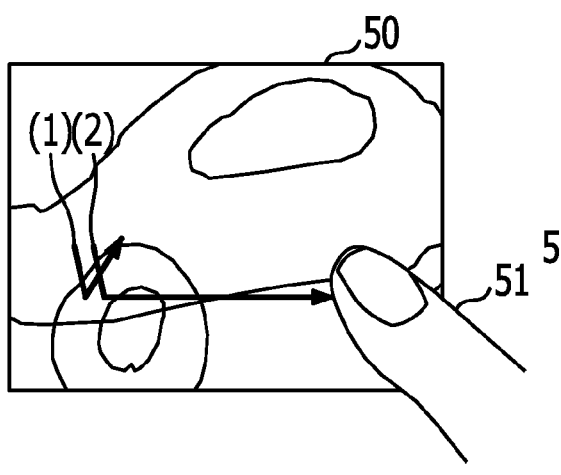
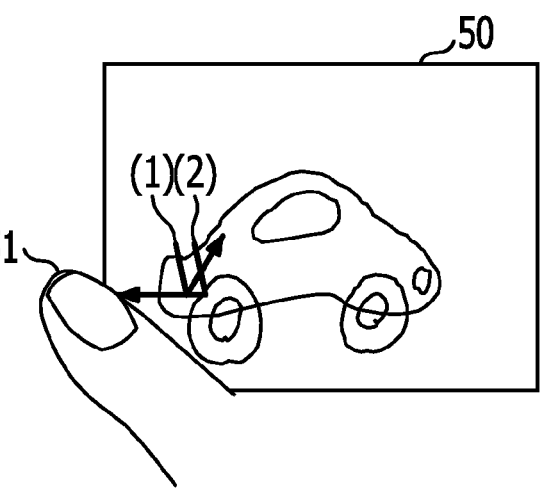

DISPLAY METHOD AND INFORMATION PROCESSING DEVICE

CROSS-REFERENCE TO RELATED APPLICATION

This application is based upon and claims the benefit of priority from the prior Japanese Patent Application No. 2012-148817 filed on Jul. 2, 2012, the entire contents of which are incorporated herein by reference.

FIELD

The technology disclosed in embodiments is related to a display method, a medium storing therein a display program, and an information processing device, which are used for changing the display content of a screen on the basis of a certain operation.

BACKGROUND

In the past, a method has existed that utilizes a dedicated button (for example, a zoom button) or the like, preliminarily prepared, as an operation used for performing zoom (for example, a change such as enlargement or reduction) on the display content of a screen. In the above-mentioned method, it is desirable that a button for performing zoom is provided that is due to software or hardware, and furthermore, it is desirable that the center of the zoom is fixed or preliminarily set. In addition, a method has existed that performs zoom with a predetermined scaling factor every time a button is pressed down once, or a method has existed where display is updated with an enlargement factor being changed with a predetermined rate while a button is pressed. In addition, a method has existed where the position of the center point of zoom is fixed to the center of a screen, or a method has existed that performs preliminary setting such as utilizing a point at which a screen has been most recently touched.

In addition, as another method for changing a display content, a method has existed that utilizes, for example, a zoom slider. A user moves a slider realized owing to software or hardware, and hence, a zoom factor is changed. In addition, when the zoom slider is used on the software, it is desirable that the display area of the slider is provided on a screen, and it takes an installation cost to provide the zoom slider on the hardware. In addition, in the case of the slider, for example, there is a problem that it takes labor to separately provide the center of zoom.

In addition, a method has existed where a touch panel capable of performing multi-touch detection is used and zoom or the like is performed owing to a pinching operation. In addition, the pinching operation is a method widely adopted in portable communication terminals such as smartphones of recent years. In addition, in the past, a circular-gesture zoom function has also existed where, by drawing a circle on a touch panel, the position thereof is zoomed.

Furthermore, in the past, a method has existed where zoom is started owing to the stay of a pointing input or a strong pressing force or a near region and a far region are set with a zoom starting point as a reference and zoom-in or zoom-out is performed using the individual regions. In addition, in the past, a method has existed where enlargement is performed by applying short press on a screen once and reduction is performed by applying short press on the screen twice. In addition, in the past, a method has existed where a certain amount of enlargement or reduction is performed by applying long press or a double tap on a screen. There techniques are disclosed in Japanese Laid-open Patent Publication No. 2011-28635, Japanese Laid-open Patent Publication No. 2005-234199, and Japanese Laid-open Patent Publication No. 2011-22851.

SUMMARY

According to an aspect of the invention, a display method executed by a computer, includes: receiving a first input relating to a first operation performed on a display content displayed in a display unit; receiving a second input relating to a second operation performed on the display content; and when the second input received after the first input is a drag operation, changing a display scaling factor of the display content on the basis of a movement direction of the drag operation and a distance between a reference position relating to at least one of the first input and the second input, and a current position of the drag operation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating an example of a functional configuration of an information processing device in the present embodiment;

FIG. 2 is a diagram illustrating an example of a hardware configuration of an information processing device;

FIG. 7A, FIG. 7B, FIG. 7C, and FIG. 7D are diagrams illustrating a first specific example of a display content corresponding to a user operation;

DESCRIPTION OF EMBODIMENTS

Figure 3A:
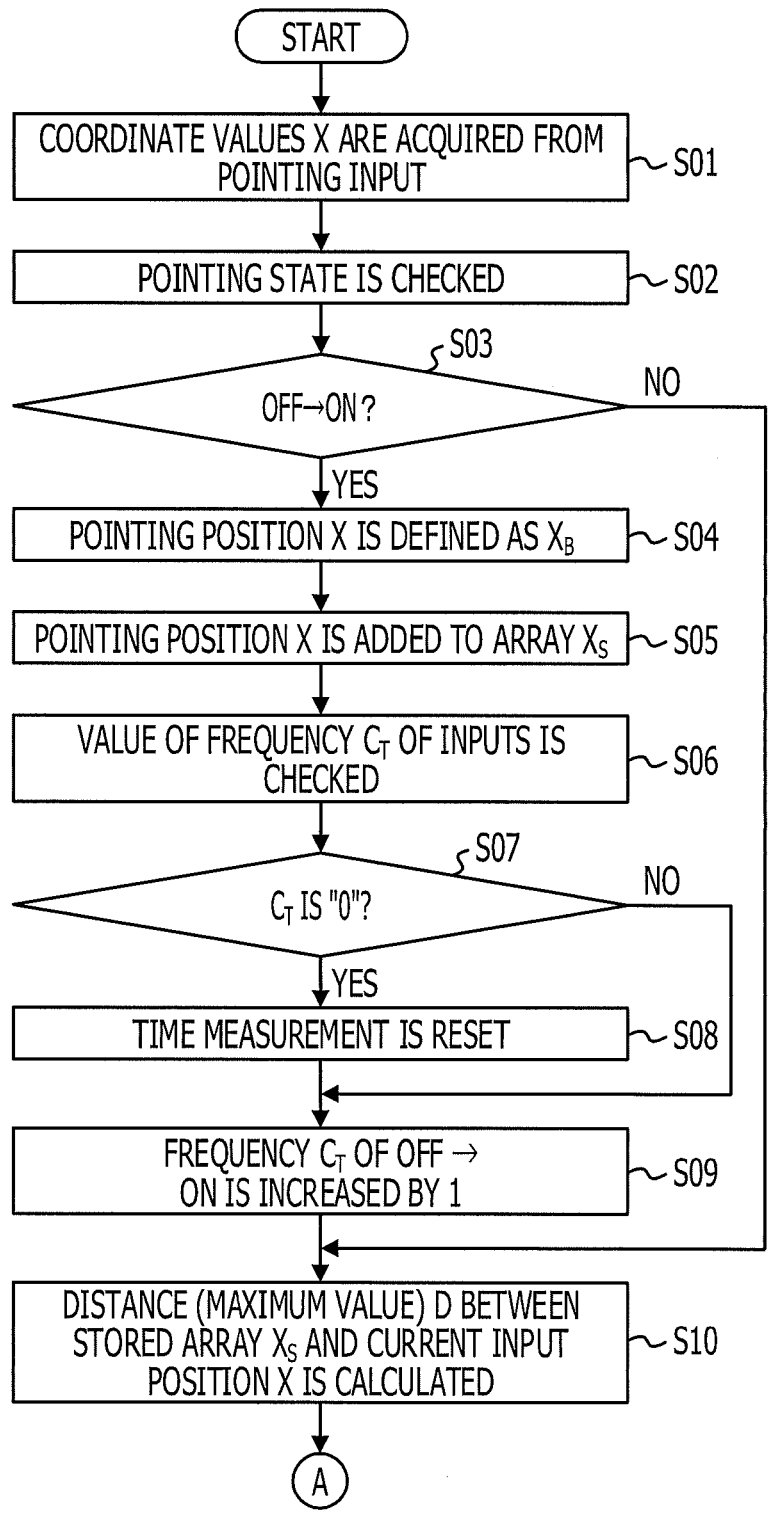
FIG. 3A and FIG. 3B are flowcharts illustrating an example of display processing in the present embodiment.

In a pinching method, since an operation is performed using a plurality of fingers, it is significantly difficult to perform an operation using a single hand, and it is desirable that usually a communication terminal is supported form a back side using one hand and an operation is performed using the other hand. In addition, in a gesture zoom function, it is also difficult to draw a circle at a certain position on a screen using one hand (in particular, a thumb), and it is desirable that an operation is performed using two hands in the same way as a pinching operation. In addition, operations in the above-mentioned methods of the related art, such as a tap (selection) and a double tap (certain scaling factor zoom) on a screen and drag (scrolling), are also used in another operation such as the selection or decision of a menu. Therefore, in the methods of the related art, if the above-mentioned operations are used at the time of a zoom operation, the same operations are mixed. Therefore, it is difficult to adequately perform the intended change of screen display.

In addition, in the past, while, as described above, a method has also existed where zoom or the like is performed owing to the staying time of a finger on a screen, it is difficult to perform another operation during the staying, and a latency time due to the staying is taken.

Furthermore, when enlargement is performed owing to a double tap, zoom is performed with a preliminarily set value while it is difficult to arbitrarily specify a zoom factor. Accordingly, in the methods of the related art, it has been difficult to change the display content of a screen to an adequate arbitrary scaling factor using a simple operation, for example, a single-handed operation or the like.

In view of such a problem, an object of the disclosed technology is to adequately change the display content of a screen using a simple operation.

Hereinafter, embodiments will be described in detail with reference to accompanying drawings.

<Example of Functional Configuration of Information Processing Device in Present Embodiment>

FIG. 1 is a diagram illustrating an example of the functional configuration of an information processing device in the present embodiment. An information processing device 10 illustrated in FIG. 1 includes a position input unit 11, an input-frequency measurement unit 12, an input-position holding unit 13, a time measurement unit 14, a distance calculation unit 15, a state reset unit 16, a drag determining unit 17, a mode controller 18, a reference position calculation unit 19, a change amount calculation unit 20, a display content setting unit 21, and a display unit 22.

The position input unit 11 receives, for example, the input of an arbitrary position (pointing position) on a display screen in the display unit 22. In addition, for example, in a case where the display unit 22 is a touch panel, when a user depresses the screen of the display unit 22 using a finger, an electronic pen, or the like, the position input unit 11 detects a depressed position owing to the pressure or temperature thereof, and hence, receives the input of position information. In addition, in the position input unit 11, a position input due to drag may also be available. Here, the drag indicates a state where, for example, the finger or the like of the user is caused to move in a state of being in contact with the screen of the display unit 22. Accordingly, the position information input to the position input unit 11 owing to the drag turns out to continue changing every certain time period.

In addition, the position input unit 11 may not receive a position input due to the touch panel, and receives a position input utilizing an arbitrary pointing device such as, for example, a mouse, a trackball, or object tracking due to the real-time analysis of a camera image. For example, when the mouse, the trackball, or the like is used, the position input unit 11 receives a position obtained with a certain operation as a trigger, the examples of the certain operation including depressing a key, a drag operation, and moving a certain object in a certain direction. In addition, while the position input unit 11 may receive, as coordinate information, an indicating position from the user, the position input unit 11 is not limited to this.

The input-frequency measurement unit 12 measures, for example, the number of times position inputs have been received from the position input unit 11. Specifically, for example, when the display unit 22 is a touch panel, the input-frequency measurement unit 12 measures the number of times the display unit 22 has been switched from a non-depressed state to a depressed state, using a finger, an electronic pen, or the like. Accordingly, the frequency of inputs turns out to be, for example, the number of times position inputs from the position input unit 11 have switched from turn-off (OFF) to turn-on (ON) (for example, the number of times a tap has been performed), or the like.

The input-position holding unit 13 holds the starting point of a position input, the ending point of the position input, or both thereof from a time point when the frequency of position inputs the input-frequency measurement unit 12 holds has increased from "0". For example, when the display unit 22 is a touch panel, the coordinates of a point at which the finger or the like of the user has depressed the touch panel correspond to the starting point of a position input, and the coordinates of a point at which the finger or the like of the user has left the touch panel correspond to the ending point of a position input. In addition, the input-position holding unit 13 holds not only an input position input last but also, for example, a plurality of previous input positions, as an array. In addition, as for how many input positions are held, the number of input positions is set on the basis of, for example, a calculation content or the like in the distance calculation unit 15 or the reference position calculation unit 19. In addition, the input-position holding unit 13 may also hold input positions whose number is preliminarily set.

The time measurement unit 14 measures a time having elapsed from a time point when the frequency of position inputs the input-frequency measurement unit 12 holds has increased from "0". In addition, the time measurement unit 14 may also measure the elapsed time owing to, for example, counting up due to a counter or the like preliminarily provided, and may also measure the elapsed time on the basis of an internal clock such as a real time clock (RTC).

The distance calculation unit 15 calculates the value of a distance between the position of the starting point and a current input position with respect to input position information the input-position holding unit 13 holds. In addition, when the frequency of position inputs is not "0", the distance calculation unit 15 calculates, for example, a distance between the position of the above-mentioned starting point and an input position at present during a drag operation with certain timing or in real time.

Here, the distance obtained in the distance calculation unit 15 is used for determining whether or not the positions of individual taps are sufficiently close to one another in a plurality of successive taps in a zoom operation in the present embodiment. In this case, for example, with respect to a plurality of individual input positions held in the input-position holding unit 13, the distance calculation unit 15 obtains a maximum value in distances between an initial point held therein and the remaining points. In addition, on the basis of the maximum value in the distances, it is determined whether the positions of individual taps are sufficiently close to one another. However, the distance calculation unit 15 is not limited to this.

When a measured time obtained from the time measurement unit 14 has exceeded a preliminarily set threshold value or the value of a distance obtained from the distance calculation unit 15 has exceeded a preliminarily set threshold value, the state reset unit 16 resets the states of the frequency of inputs and the like the input-frequency measurement unit 12 holds. In addition, while indicating, for example, zeroing the frequency of inputs, the resetting is not limited to this. In other words, for example, in a plurality of successive taps in the zoom operation in the present embodiment, it may be possible for the state reset unit 16 to put a restriction on a time taken for the successive taps or a distance between the successive taps.

On the basis of the movement amount of successive input positions in the position input unit 11, the drag determining unit 17 determines whether or not the input of the user is a drag input. In addition, specifically, the state of input providing successive input positions is a state (drag state) where the change of the frequency of inputs does not exist and position information from the user in a current display screen is moving. However, the drag determining unit 17 is not limited to this.

In other words, on the basis of the movement amount of successive input positions in the position input unit 11, the drag determining unit 17 determines whether or not being a drag input. In other words, a distance, over which an indicating position has moved from a position at which an indicating position input has been turned on (ON) without the indicating position input having been turned off (OFF), is compared with a preliminarily set threshold value, and hence, it is determined whether or not being an input due to a drag operation.

Here, while the movement distance of a position may be the length of a route (path) through which the position has moved or a linear distance from a position input starting point to a current indicating position, the movement distance of a position is not limited to this. In addition, the threshold value used for determining whether or not drag is being performed is set to a value substantially larger than the movement amount of an input position from the turn-on (ON) of an input to the turn-off (OFF) thereof, which may occur in a tap, so as to clarify a difference from, for example, a simple tap. For example, in the present embodiment, when a tap operation results in a maximum movement amount of about 10 mm, the threshold value may be made about 20 mm or more. However, the threshold value is not limited to this. Furthermore, while, in the present embodiment, the distribution of the movement amount of a tap may be preliminarily studied and a statistically substantially large threshold value may also be set, a method for setting the threshold value is not limited to this.

When the frequency of inputs the input-frequency measurement unit 12 holds is greater than or equal to a certain number (for example, "2"), the mode controller 18 performs control for, for example, a transition from a normal mode to a zoom mode. In addition, in addition to the above-mentioned condition of the frequency of inputs, for example, when the drag determining unit 17 has determined as being drag, the mode controller 18 may also perform control for a transition to a zoom mode.

Specifically, for example, when the drag determining unit 17 has determined as being drag, the mode controller 18 transitions to a scroll mode or the zoom mode in response to the frequency of inputs the input-frequency measurement unit 12 holds. In addition, the mode controller 18 may call the state reset unit 16 and cancel a mode when a position input has been turned off.

In addition, for example, when a transition to the zoom mode is not performed, the mode controller 18 performs control for a transition to a scroll mode (alternatively, maintains the scroll mode). Specifically, when the frequency of inputs the input-frequency measurement unit 12 holds is greater than or equal to a certain frequency (for example, "2"), the mode controller 18 transitions to the zoom mode. In addition, when the frequency of inputs the input-frequency measurement unit 12 holds is less than a certain frequency (for example, "1"), the mode controller 18 transitions to the scroll mode.

Furthermore, when an input position has moved a certain amount or more in a circular arc shape with, for example, a reference position as a center, the reference position being calculated by the reference position calculation unit 19, it may be possible for the mode controller 18 to transition to a rotation mode causing a display content to be rotated in a certain direction.

Furthermore, for example, a certain operation is performed on the screen of the display unit 22 using a finger or the like of the user, and hence, the mode controller 18 may also perform control so as to cancel the change of a display mode. Specifically, when the movement direction of an input position due to a drag input has been changed at the time of the zoom mode or at the time of the rotation mode, the mode controller 18 cancels the change of a display content, processed in each mode, and returns the change of a display content to a display content before a mode transition.

On the basis of an input position (for example, a starting point or the like) held by the input-position holding unit 13, the reference position calculation unit 19 calculates a position serving as the reference of zoom. In addition, the coordinates of a reference position calculated in the reference position calculation unit 19 may also be, for example, the average of a plurality of input point coordinates held in the input-position holding unit 13, and may also be initial or final point coordinates held in the input-position holding unit 13. However, the coordinates of the reference position is not limited to this.

On the basis of the reference position (center position) of zoom, obtained in the reference position calculation unit 19 after a transition to the zoom mode, and position information input from the position input unit 11, the change amount calculation unit 20 calculates a zoom factor with respect to a display content. In addition, the zoom factor may be calculated using, for example, a value obtained by linearly transforming a difference value in a lateral direction (for example, an x-coordinate) or a difference value in a longitudinal direction (for example, a y-coordinate) between a reference position calculated by the reference position calculation unit 19 and a current input position and a zoom factor shortly before the transition to the zoom mode. Specifically, while the zoom factor may be calculated by multiplying a value, obtained by linearly transforming the difference value in the lateral direction (for example, the x-coordinate) or the difference value in the longitudinal direction (for example, the y-coordinate), by the zoom factor shortly before the transition to the zoom mode, a calculation method is not limited to this. For example, in the present embodiment, a calculation method utilizing the above-mentioned linear transformation may be used for one of enlargement zoom and reduction zoom (for example, at the time of the enlargement zoom), and another preliminarily set calculation method may also be used for the other (for example, at the time of the reduction zoom) without using the linear transformation.

Furthermore, when a transition to the rotation mode has been performed owing to the mode controller 18, the change amount calculation unit 20 acquires a rotation angle corresponding to the movement amount of circular arc-shaped rotational movement (circular arc movement) with the reference position as a center. Specifically, on the basis of, for example, the rotation angle shortly before the transition to the rotation mode and an angle between a line segment connecting the reference position with a current input position and a horizontal line passing through the reference position, the change amount calculation unit 20 acquires the rotation angle.

The display content setting unit 21 holds various kinds of setting contents such as, for example, a display position in the scroll mode, a zoom factor at the time of a transition to the zoom mode, and a rotation angle at the time of a transition to the rotation mode. In addition, on the basis of the held setting contents, the display content setting unit 21 changes the display content of the display unit 22.

In addition, the amounts of change (for example, a scrolling amount, a zoom factor, a rotation angle, and the like) in a display content in the display content setting unit 21 are acquired by, for example, the change amount calculation unit 20 or the like. Accordingly, on the basis of the reference position obtained from the reference position calculation unit 19 and the amounts of change obtained from the change amount calculation unit 20, the display content setting unit 21 changes a display content so that the display content corresponds to a certain display mode.

For example, when the display unit 22 is a touch panel, a scroll operation or the like is performed so as to follow the movement of a finger of the user on the touch panel, at the time of the scroll mode. In addition, as for which type of scrolling is performed with respect to the movement of a finger, an arbitrary setting may be performed owing to the display content setting unit 21. In other words, at the time of the above-mentioned scroll mode, using pieces of information such as a display position shortly before a transition to the scroll mode and a distance between a reference position obtained in the reference position calculation unit 19 and an input position input from the position input unit 11, a display content is set in the display content setting unit 21. In addition, at the time of the above-mentioned zoom mode, using pieces of information such as a zoom factor shortly before a transition to the zoom mode, a distance between a reference position obtained in the reference position calculation unit 19 and an input position input from the position input unit 11, and a direction, a display content is set in the display content setting unit 21.

Here, for example, at the time of the zoom mode, the display content setting unit 21 may set so that certain guide display indicating that a current display content is the zoom mode is displayed at a certain position calculated on the basis of the reference position (center position) of the zoom. In addition, while the guide display includes, for example, at least one of a reference mark corresponding to a size (zoom factor) before a transition to the zoom mode and a direction mark indicating the direction of an input position used for changing a display content, the guide display is not limited to this. In addition, the guide display may also include a current zoom factor. In addition, the guide display may also include a zoom mark obtained by enlarging or reducing the reference mark so that the zoom mark corresponds to the zoom factor.

In addition, when display has already been performed with a certain zoom factor due to the zoom mode at the time of a transition to the rotation mode, the display content setting unit 21 may also rotate a display content with maintaining the set zoom factor, and may also rotate a display content with returning to the value of a zoom factor before the transition to the zoom mode.

In addition, in the present embodiment, when a current input position due to a drag operation is located near the screen end of the display unit 22 at the time of the zoom mode, a finger of the user performing the drag operation is caused to stay during a certain time. Owing to this operation, it may be possible for the display content setting unit 21 to set so that scroll display is caused to be displayed in a direction in which the reference position is located away from the current input position (the vicinity of the screen end). In addition, the above-mentioned scroll display may also be applied to, for example, a case where current display is the rotation mode.

Furthermore, when the change of a display mode has been cancelled in the mode controller 18, the display content setting unit 21 may also set so as to cancel the change of a display content due to each display mode.

On the basis of various kinds of setting information or the like in the display content setting unit 21, the display unit 22 changes the display content of a screen. For example, using a certain zoom factor obtained in the change amount calculation unit 20, the display unit 22 subjects display contents such as an image, a video, a document (for example, a web page or the like), and a text to zoom display (enlargement or reduction) with a certain center position as a reference, the certain center position being obtained in the reference position calculation unit 19. In addition, on the basis of the setting information in the display content setting unit 21, the display unit 22 causes a display content to be rotated or causes a display content to be subjected to a scroll operation. In addition, the display unit 22 may also have a function as an input unit inputting information by detecting pressure or the like on a screen due to a finger of the user, a pen, or the like, for example, in such a way as a touch panel or the like, and may also have a function as an output unit outputting the above-mentioned display contents.

In addition, the display unit 22 may also be based on an organic electro luminescence (EL) method or a liquid crystal method, and may just have display resolution sufficient enough for displaying a software keyboard or an input handwriting. In addition, as a touch panel, for example, a resistive film method, an electrostatic capacity method, an optical method, an electromagnetic induction method, or the like may be used, and, for example, if a method has a sampling rate and resolution enough to allow a touch input and a handwriting input to be performed on the software keyboard, it doesn't matter what kind.

Here, as one embodiment, the above-mentioned information processing device 10 is installed using, for example, a computer system equipped with a touch panel device integrated with a display device, and software operating thereon. In addition, the portion of the software may also be realized owing to hardware having an equivalent function. As such a computer system, for example, a communication terminal such as a mobile phone, a smartphone, a tablet terminal, and a personal digital assistant (PDA) may be used. In addition, as the information processing device 10, for example, a personal computer (PC), a game console, a music reproduction device, or the like may be used.

Owing to the above-mentioned information processing device 10, it may be possible to change the display content of a screen to an adequate arbitrary scaling factor using a simple operation. In addition, while, in the present embodiment, it may not only be possible to change a display content to an arbitrary scaling factor but it may also be possible to rotate a display content or cancel the change of a display content due to each display mode, an embodiment is not limited to this.

<Information Processing Device 10: Example of Hardware Configuration>

Here, in the above-mentioned information processing device 10, an execution program (display program) is created that is capable of causing a computer to execute each function, the execution program is installed into, for example, a general-purpose PC or the like, and hence, it may be possible to realize the display processing in the present embodiment.

Here, an example of the hardware configuration of a computer will be described that may realize the display processing in the present embodiment.

FIG. 2 is a diagram illustrating an example of the hardware configuration of an information processing device. In addition, in the example of FIG. 2, a hardware configuration when the information processing device is a communication terminal such as a smartphone is illustrated.

In the example of FIG. 2, a microphone 31, a speaker 32, a display unit 33, an operation unit 34, a power unit 35, a wireless unit 36, a short-distance communication unit 37, an auxiliary storage device 38, a main storage device 39, a central processing unit (CPU) 40, and a drive device 41 are included.

The microphone 31 inputs a voice emanating from a user or another sound. The speaker 32 outputs the voice of a call partner or outputs a sound such as a ring alert. While the microphone 31 and the speaker 32 are used at the time of, for example, talking with the other person owing to a telephone function or the like, the microphone 31 and the speaker 32 are not limited to this. In addition, for example, information or various kinds of instructions may be input using the microphone 31, and owing to speaker 32, a processing result, error information, or the like may also be acquired using a voice.

The display unit 33 displays information relating to whether or not being time information or outside a communication range, image data, text data such as document data, and the like. In addition, the display unit 33 corresponds to the display unit 22 illustrated in FIG. 1.

At the time of settings in various kinds of functions, at the time of registering a phone number or the like, or at the time of an outgoing call and an incoming call, the operation unit 34 is depressed by a user. In addition, for example, when the display unit 33 has the function of a touch panel or the like, the operation unit 34 may adequately change a content, displayed in a screen, to an arbitrary scaling factor or perform a rotational operation by performing a certain operation on the screen, for example.

The power unit 35 supplies electric power to individual configurations in the information processing device 10. In addition, while the power unit 35 is, for example, an internal power supply such as a battery, the power unit 35 is limited to this. In addition, the power unit 35 may also detect an electric power amount on a continuous basis or with a certain time interval, and may also monitor the electric power amount or the like.

The wireless unit 36 is a transmission and reception unit for communication data, which receives a wireless signal (communication data) from a base station using, for example, an antenna or transmits a wireless signal to the base station through the antenna. In addition, the wireless unit 36 measures a reception intensity due to, for example, receive signal strength indication (RSSI) or the like, and in the case of a state in which communication may be performed on the basis of that measurement result, the wireless unit 36 performs the transmission and reception of communication data.

Using a communication method such as, for example, infrared communication or Bluetooth (registered trademark), the short-distance communication unit 37 performs short-distance communication with an external device. The wireless unit 36 and the short-distance communication unit 37, described above, are communication interfaces enabling data to be transmitted and received to and from the external device. Using the communication interface, it may be possible to acquire an execution program and the like from the connected external device or the like, or it may be possible to provide an execution result obtained by executing a program or the execution program itself corresponding to the present embodiment, to the external device or the like.

The auxiliary storage device 38 is, for example, a storage mechanism such as a hard disk drive or a solid state drive (SSD), stores therein the execution program, a control program, and the like in the present embodiment, and performs inputting or outputting as desired.

The main storage device 39 stores therein the execution program or the like read from the auxiliary storage device 38 owing to an instruction from the CPU 40, or stores therein various kinds of information obtained during the execution of a program. In addition, while including, for example, a read only memory (ROM), a random access memory (RAM), or the like, the main storage device 39 is not limited to this.

On the basis of a control program such as an operating system (OS) and the execution program stored in the main storage device 39, the CPU 40 controls the entire processing of the computer, such as various kinds of calculation and the input and output of data with each hardware configuration unit, and hence, realizes each processing operation in screen display. In addition, various kinds of information or the like, desired during the execution of a program, may be acquired from the auxiliary storage device 38, and an execution result or the like may be stored.

It may be possible to acquire the execution program from the connected management server 12 or the like, or it may be possible to provide an execution result obtained by executing a program or the execution program itself corresponding to the present embodiment, to the external device or the like.

It may be possible to attachably and detachably set, for example, a recording medium 42 or the like in the drive device 41, and it may be possible for the drive device 41 to read various kinds of information recorded in the set recording medium 42 or write certain information into the recording medium 42. In addition, while including, for example a medium loading slot or the like, the drive device 41 is not limited to this.

As described above, the recording medium 42 is a computer-readable recording medium storing therein the execution program or the like. The recording medium 42 may also be, for example, a semiconductor memory such as a flash memory. In addition, the recording medium 42 may also be a portable recording medium such as a Universal Serial Bus (USB) memory.

Here, the execution program installed into the main body of the computer in the present embodiment is provided owing to the portable recording medium 42 or the like, such as, for example, a flash memory. The recording medium 42 recording therein a program may be set in the drive device 41, and on the basis of a control signal from the CPU 40, the execution program included in the recording medium 42 is installed into the auxiliary storage device 38 from the recording medium 42 through the drive device 41. In other words, in the present embodiment, by installing the execution program (for example, a display program or the like) into the hardware configuration of the main body of the above-mentioned computer, a hardware resources and software cooperate with each other, and the display processing or the like in the present embodiment may be realized. In addition, the display program corresponding to the above-mentioned display processing may be in, for example, a state of being resident on a device, and may also be activated by an activation instruction.

<Example of Display Processing in Present Embodiment>

Figure 3B:
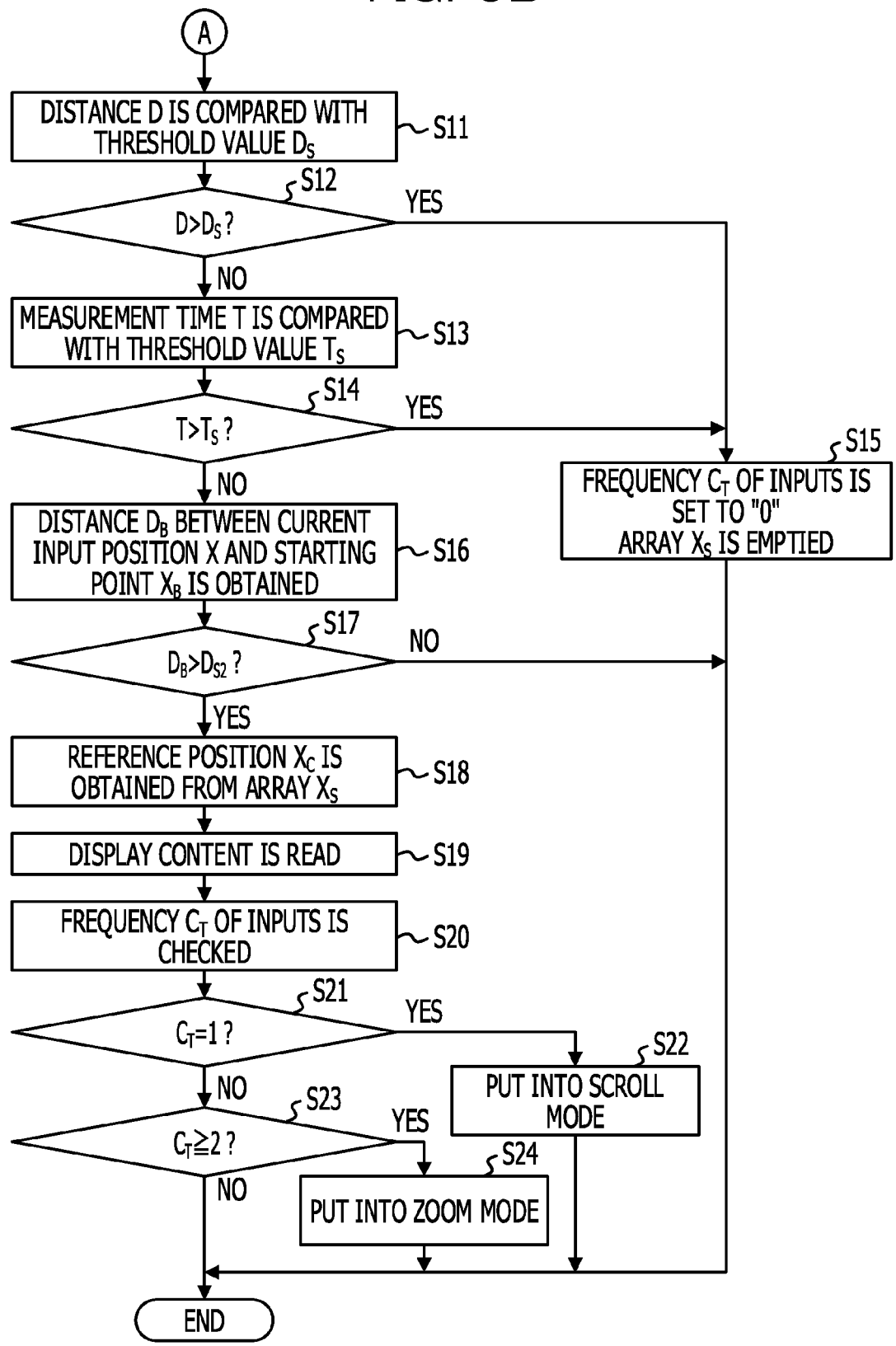

Next, an example of the display processing in the present embodiment will be described using flowcharts. FIG. 3A and FIG. 3B are flowcharts illustrating an example of the display processing in the present embodiment. In addition, in the following description, as an example, display processing from the normal mode (a state where a mode transition in the present embodiment has not been performed) will be described. In addition, it is assumed that the display unit 22 displaying target data such as image data or document data includes, for example, a touch panel or the like as described above and it may be possible to perform a position input or the like owing to an operation on the screen, performed by the user or the like.

The display processing illustrated in FIG. 3 acquires the coordinate values X (X=(x, y)) of an input position from a pointing input (position input) on the screen due to, for example, the user (S01). Next, the display processing checks a pointing state (S02), and determines whether or not a pointing state has been changed from OFF (a non-depressed state) to ON (a depressed state) (S03). In addition, for example, when the display unit 22 is a touch panel or the like as described above, the pointing state is a state where the user has tapped the screen.

When the pointing state has been changed from OFF to ON (in the S03, YES), the display processing stores the pointing position X acquired in the processing operation in the S01, in the input-position holding unit 13 or the like (S04). In addition, the pointing position at this time is defined as $X_B$. Furthermore, the display processing adds, to an array $X_S$, the pointing position X acquired in the processing operation in the S01 (505). The processing operation in the S05 is used, for example, when the average of input point coordinates is calculated or when a reference position is set on the basis of acquired initial or final point coordinates.

Next, the display processing checks the value of the frequency $C_T$ of inputs (S06), and determines whether or not the $C_T$ is "0" (S07). When the $C_T$ is "0" (in the S07, YES), the display processing resets time measurement (S08). In other words, a measurement time T is set to "0". Here, after the processing operation in the S08 or when the $C_T$ is not "0" in the processing operation in the S07 (in the S07, NO), the display processing increases, by "1", the frequency $C_T$ of being changed from OFF to ON (S09).

Next, after the processing operation in the S09 or when, in the S03, a pointing state has not changed from OFF to ON (in the S03, NO), the display processing calculates a distance (in the example of FIG. 3, a maximum value) D between the stored array $X_S$ and the current input position X (S10). In addition, the above-mentioned case of not having changed from OFF to ON also includes a case where the pointing state has already remained in an ON state, for example, in the processing operation in the S02.

In addition, the display processing compares the distance D obtained in the processing operation in the S10 with a preliminarily set threshold value $D_S$ for a distance (S11), and determines whether or not the distance D is larger than the threshold value $D_S$ ($D>D_S$?) (S12). When the distance D is not larger than the threshold value $D_S$ (namely, $D \leq D_S$) (in the S12, NO), the display processing compares the measurement time T with a preliminarily set threshold value $T_S$ for a measurement time next (S13), and determines whether or not the measurement time T is larger than the threshold value $T_S$ ($T>T_S$?) (S14).

Here, when, in the above-mentioned processing operation in the S12, the distance D is larger than the threshold value $D_S$ (in the S12, YES), the display processing sets the frequency $C_T$ of inputs to "0" and empties the array $X_S$ (S15), and then, terminates the processing. In other words, in the processing operation in the S15, the reset of a state is performed. In addition, when, in the processing operation in the S14, the measurement time T is larger than the threshold value $T_S$ (in the S14, YES), the display processing performs the above-mentioned processing operation in the S15, and terminates the processing.

Next, when, in the processing operation in the S14, the measurement time T is not larger than the threshold value $T_S$ (namely, $T \leq T_S$) (in the S14, NO), the display processing obtains a distance $D_B$ between the current input position X and a starting point $X_B$ (S16). In addition, the display processing determines whether or not the distance $D_B$ is larger than a preliminarily set second threshold value $D_{S2}$ ($D_B>D_{S2}$?) (S17). In addition, in the processing operation in the S17, using the second threshold value $D_{S2}$, drag judgment is performed. When, in the processing operation in the S17, the distance $D_B$ is larger than the second threshold value $D_{S2}$ (in the S17, YES), the display processing determines that the user performs the drag operation, and obtains a reference position $X_C$ from the array $X_S$ (S18). In addition, in the processing operation in the S18, for example, the initial coordinate values of the array $X_S$ are defined as the reference position $X_C$.

Next, the display processing reads a current display content (S19). While, in the processing operation in the S19, for example, a current display position $X_D$, a current zoom factor $S_D$, and a current rotation angle $R_D$ may be read, the processing operation in the S19 is not limited to this. In addition, the current display position $X_D$ includes the position coordinates of display data located in, for example, the center of the screen.

Next, the display processing checks the frequency $C_T$ of inputs (S20), and determines whether or not the frequency $C_T$ of inputs is "1" ($C_T$="1"?) (S21), and when the frequency $C_T$ of inputs is "1" (in the S21, YES), the display processing causes the display mode to transition to the scroll mode, and changes a display content (S22). In addition, when, in the S21, the frequency $C_T$ of inputs is not "1" (in the S21, NO), the display processing determines whether or not the frequency $C_T$ of inputs is greater than or equal to "2" ($C_T \geq$ "2"?) (S23), and when the frequency $C_T$ of inputs is greater than or equal to "2" (in the S23, YES), the display processing causes the display mode to transition to the zoom mode, and changes a display content (S24). In other words, in the processing operation in the S24, the display content is enlarged or reduced with a certain zoom factor set by, for example, the above-mentioned display content setting unit 21. In addition, when, in the S23, the frequency $C_T$ of inputs is not greater than or equal to "2" (in the S23, NO), the display processing terminates the processing without change.

In addition, when the distance $D_B$ is less than or equal to the second threshold value $D_{S2}$ (in the S17, NO), the display processing determines that the user does not perform the drag operation, and terminates the processing.

In addition, in the above-mentioned processing operations in S21 to S24, the display mode transitions to the scroll mode when the frequency $C_T$ of inputs is "1", and the display mode transitions to the zoom mode when the frequency $C_T$ of inputs is greater than or equal to "2". However, the processing operations in S21 to S24 are not limited to this, and the individual frequencies may be arbitrarily set to certain frequencies. Accordingly, for example, the display mode may also transition to the scroll mode when the frequency $C_T$ of inputs is "2", and the display mode may also transition to the zoom mode when the frequency $C_T$ of inputs is greater than or equal to "3".

<S22: Example of Display Processing at Time of Scroll Mode>

Figure 4:
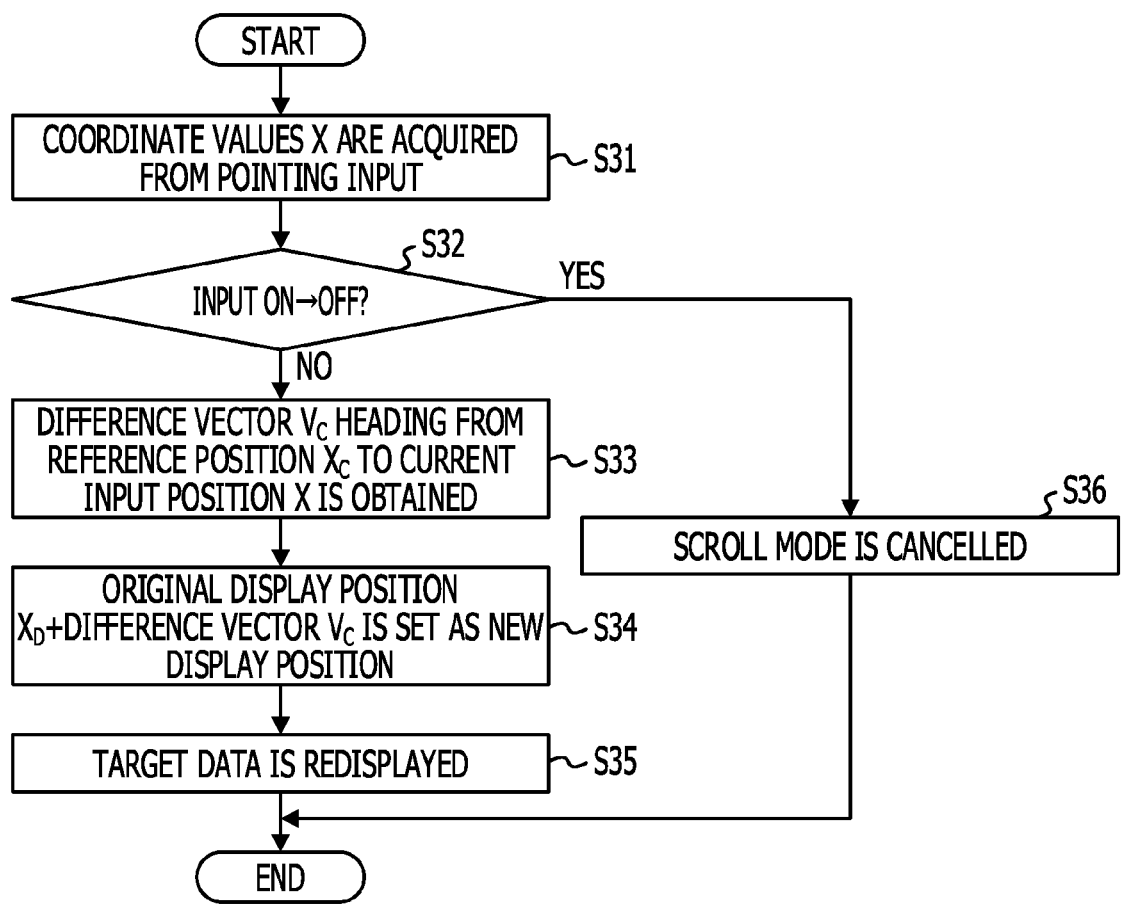
FIG. 4 is a flowchart illustrating an example of display processing at the time of a scroll mode.

Next, using a flowchart, an example of display processing at the time of a scroll mode will be described that corresponds to the above-mentioned processing operation in the S22. FIG. 4 is a flowchart illustrating an example of display processing at the time of a scroll mode.

The display processing illustrated in FIG. 4 acquires the coordinate values X (X=(x, y)) of an input position from a pointing input on the screen due to, for example, the user (S31). Next, the display processing determines whether or not a pointing state due to the user has been changed from ON (a depressed state) to OFF (a non-depressed state) (S32). Here, when the pointing state has not been changed from ON to OFF (in the S32, NO), the display processing obtains a difference vector $V_C$ heading from the reference position $X_C$, obtained by the above-mentioned processing operation in the S18, to the current input position X (S33). Here, the difference vector $V_C$ includes the information of a difference value and a direction.

Next, the display processing sets, as a new display position, a position $(X_D+V_C)$ to which a display position is moved from the original display position $X_D$ by the difference vector $V_C$ (S34), performs the scroll operation with the set display position as a reference, and redisplays target data (for example, image data) (S35).

In addition, when, in the processing operation in the S32, an input has changed from ON to OFF (in the S32, YES), the display processing cancels the scroll mode (S36).

<S24: Example of Display Processing at Time of Zoom Mode>

Figure 5:
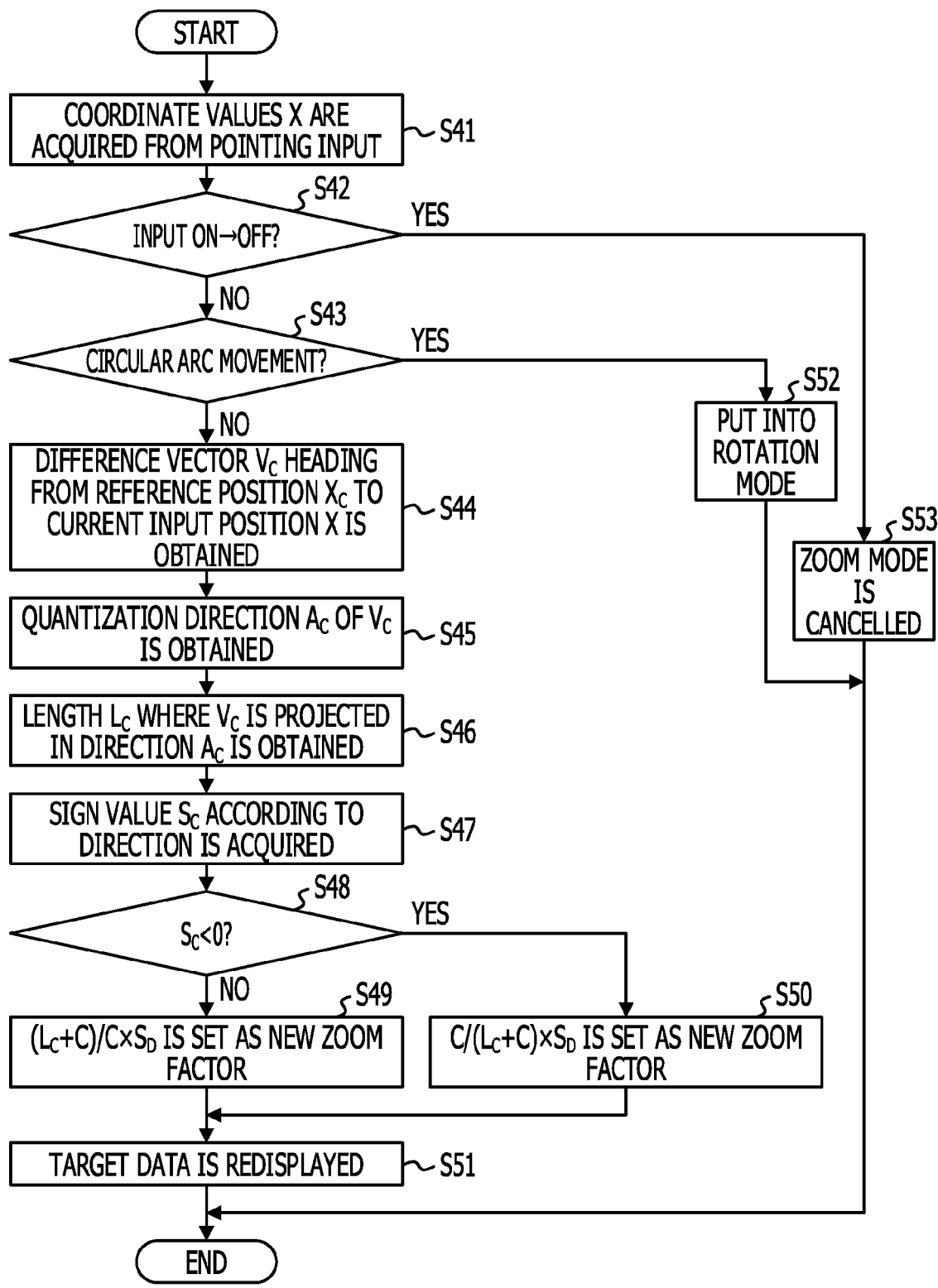
FIG. 5 is a flowchart illustrating an example of display processing at the time of a zoom mode.

Next, using a flowchart, an example of display processing at the time of a zoom mode will be described that corresponds to the above-mentioned processing operation in the S24. FIG. 5 is a flowchart illustrating an example of display processing at the time of a zoom mode.

The display processing illustrated in FIG. 5 acquires the coordinate values X (X=(x, y)) of an input position from a pointing input due to, for example, the user (S41). Next, the display processing determines whether or not a pointing state due to the user has been changed from ON (a depressed state) to OFF (a non-depressed state) (S42).

When the pointing state has not been changed from ON to OFF (in the S42, NO), the display processing determines whether or not the trajectory of the input position X with respect to the reference position $X_C$ performs a certain circular arc movement (S43). In addition, as for the determination of whether or not performing the circular arc movement, for example, when a plurality of input positions are acquired at a certain time interval, distances between the acquired plural input positions and the reference position are calculated, and the input position is moving with the distances maintaining distances falling within a given range, it is determined that the circular arc movement is performed. In addition, a determination method for the circular arc movement is not limited to this.

Here, when having determined that the circular arc movement is not performed (in the S43, NO), the display processing obtains the difference vector $V_C$ heading from the reference position $X_C$ to the current input position X (S44), and obtains the quantization direction $A_C$ of the obtained $V_C$ (S45). Next, the display processing obtains a length $L_C$ where the $V_C$ is projected in the direction $A_C$, and acquires a sign value $S_C$ according to a direction (S47).

Here, the display processing determines whether or not the $S_C$ is less than "0" ($S_C$<"0"?) (S48), and when the $S_C$ is greater than or equal to "0" (when the sign value is positive) (in the S48, NO), the display processing sets a new zoom factor owing to certain calculation (S49). In addition, in the processing operation in the S49, the zoom factor may be calculated as, for example, "Zoom Factor=$(L_C+C)/C \times S_D$", and the C, the $S_D$, and the $L_C$ indicate a given number, a zoom factor before a transition to the zoom mode, and a distance between a point projected in the axis direction of enlargement or reduction and the reference position, respectively.

In addition, when the $S_C$ is smaller than "0" (when the sign value is negative) (in the S48, YES), the display processing sets a new zoom factor owing to certain calculation (S50). In addition, in the processing operation in the S50, the zoom factor may be calculated as, for example, "Zoom Factor=$C/(L_C+C) \times S_D$". In addition, calculation methods in the processing operations in the S49 and S50 may not be limited to these.

In addition, after the termination of the processing operations in the S49 and S50, the display processing redisplays target data enlarged or reduced on the basis of the set zoom factor (S51). In other words, in the display processing illustrated in the example of FIG. 5, enlargement zoom or reduction zoom may be performed on the basis of a drag direction at the time of, for example, the zoom mode, and the zoom factor may be set in accordance with the length of drag.

In addition, when, in the above-mentioned processing operation in the S43, having determined that the circular arc movement is performed (in the S43, YES), the display processing causes the display mode to transition to the rotation mode and changes a display content (S52). In addition, when, in the above-mentioned processing operation in the S42, the input has been changed from ON to OFF (in the S42, YES), the display processing cancels the zoom mode (S53).

<S52: Example of Display Processing at Time of Rotation Mode>

Figure 6:
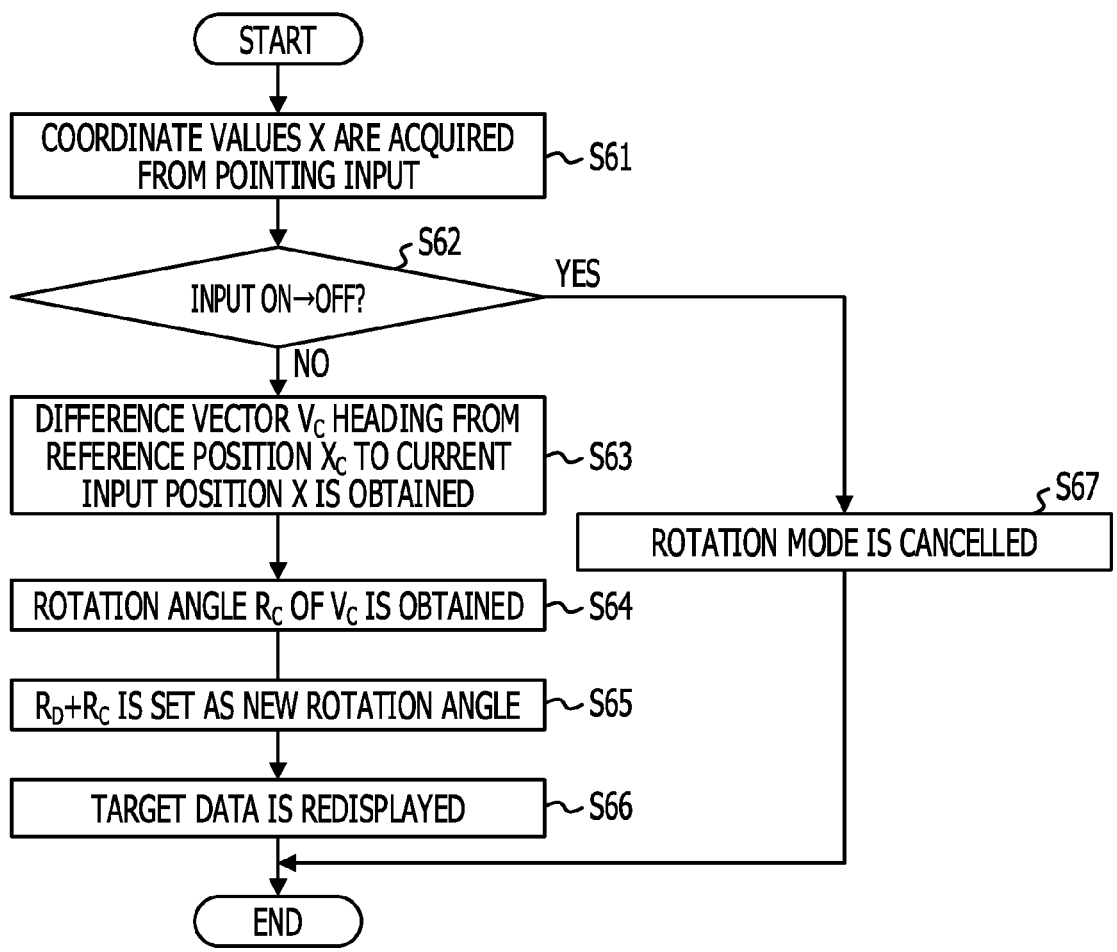
FIG. 6 is a flowchart illustrating an example of display processing at the time of a rotation mode.

Next, using a flowchart, an example of display processing at the time of a rotation mode will be described that corresponds to the above-mentioned processing operation in the S52. FIG. 6 is a flowchart illustrating an example of display processing at the time of a rotation mode.

The display processing illustrated in FIG. 6 acquires the coordinate values X (X=(x, y)) of an input position from a pointing input due to, for example, the user (S61). Next, the display processing determines whether or not a pointing state due to the user has been changed from ON (a depressed state) to OFF (a non-depressed state) (S62).

When the pointing state has not been changed from ON to OFF (in the S62, NO), the display processing obtains the difference vector $V_C$ heading from the reference position $X_C$ to the current input position X, in such a way as described above (S63), and obtains a rotation angle $R_C$ based on the difference vector $V_C$ (S64). In addition, while, in the processing operation in the S64, on the basis of, for example, an angle between the line segment of the difference vector $V_C$ and a horizontal line, the rotation angle $R_C$ may be obtained, the processing operation in the S64 is not limited to this.

Next, on the basis of, for example, the rotation angle $R_D$ shortly before a transition to the rotation mode and the rotation angle $R_C$ obtained in the S64, the display processing sets $(R_D+R_C)$ as a new rotation angle (S65). In addition, while, in the processing operation in the S65, by adding, for example, the rotation angle $R_D$ shortly before a transition to the rotation mode to the rotation angle $R_C$ obtained in the S64, a new rotation angle may be obtained, a calculation method for a new rotation angle is not limited to this. In addition, on the basis of the set rotation angle, the display processing rotates and redisplays target data (S66).

In addition, when, in the processing operation in the S62, the input has changed from ON to OFF (in the S62, YES), the display processing cancels the rotation mode (S67).

<Specific Example of Display Content Corresponding to User Operation>

Here, using drawings, a specific example of a display content corresponding to a user operation in the present embodiment will be described.

FIRST SPECIFIC EXAMPLE

FIG. 7A, FIG. 7B, FIG. 7C and FIG. 7D are diagrams illustrating a first specific example of a display content corresponding to a user operation. In the first specific example, owing to user operations illustrated in FIG. 7A to FIG. 7D, the change of a display content is performed. In addition, arrows (1) and (2) in FIG. 7B to FIG. 7D indicate the details of an operation performed by a finger 51 of a user on the screen 50 in the display unit 22, and are not displayed in the screen 50. In addition, in FIG. 7B to FIG. 7D, the arrow (1) indicates an operation where the finger 51 of the user taps on the screen 50. In addition, the arrow (2) indicates an operation where the finger 51 of the user taps on the screen 50 and is dragged in an arrow direction in a tapping state (in a state where the finger 51 keeps being in contact with the screen 50).

First, FIG. 7A illustrates a state before the user operation is performed (a so-called initial state). While, in the initial state illustrated in FIG. 7A, certain image data (in the example of FIG. 7, the drawing data of a car) specified by the user or the like is displayed in the screen 50 in the display unit 22, target data whose display content is to be changed may also be other image data, and is not limited to image data. As the target data, for example, video data, document data such as a Web page, text data, or the like may be cited.

Here, in the first specific example, from the initial state illustrated in FIG. 7A, in such procedures as the arrows (1) and (2) illustrated in FIG. 7B, after the finger 51 of the user has tapped on the screen 50 twice within a certain time, a drag operation is performed to the right side. In the first specific example, by performing the above-mentioned user operation, for example, a transition from the normal mode to the zoom mode is performed. In addition, the certain time indicate a measurement time from, for example, when a tap is performed once owing to the operation of the arrow (1), and a threshold value may be set as, for example, "1 second". However, the certain time is not limited to this. In addition, the number of taps may be a preliminarily set certain number, and is not limited to two.

In addition, in the first specific example, as illustrated in FIG. 7C, by continuing the drag operation in FIG. 7B and further continuing drag, enlarged display according to a drag amount (drag distance) is performed with a tap position as a center (reference position). In addition, the tap position may also be, for example, the average coordinates of position coordinates tapped owing to the arrow (1) and the arrow (2), position coordinates tapped owing to the arrow (1), or position coordinates tapped owing to the arrow (2). In other words, in the first specific example, when the distance of drag is extended, a zoom factor is changed in response thereto, and the display content of the screen 50 is changed in response to the changed zoom factor. In addition, in the examples of FIG. 7B and FIG. 7C, owing to the operation of the arrow (2), the finger 51 of the user is dragged to the right side compared with the reference position, and hence, the display of the image data is enlarged.

Furthermore, in the first specific example, the operation of the arrow (2) is performed after the operation of the arrow (1) illustrated in FIG. 7D, and the finger 51 of the user is drag-operated to the left side compared with the reference position. Therefore, the display of the display content may be reduced.

In other words, in the first specific example, in a case where the drag operation of the arrow (2) is performed, when a drag operation is performed in a preliminarily set direction, the enlarged display of the display content is performed, and when a drag operation is performed in a direction (for example, an opposite direction) other than the direction of the enlarged display, the reduced display thereof is performed. In addition, a condition relating to in which direction drag is performed with respect to the reference position to perform the change of a display content owing to enlargement or reduction may be preliminarily set in the display content setting unit 21. In addition, while, in this case, the setting may be performed with being caused to have an angular range in a certain direction, the setting is performed so that angular ranges do not overlap with each other. In addition, the setting ranges of directions at the time of causing to perform enlargement zoom and at the time of causing to perform reduction zoom may not be directions opposite to each other. However, the opposite direction may be more understandable for the user, and it may be easy for the user to perform an operation.

In addition, in the present embodiment, when the drag operation is performed without tapping twice (namely, the operation of the arrow (2) is only performed), scrolling according to a drag amount is performed as the normal mode.

<Relationship between Movement Amount Due to Drag and Zoom Factor>

Figure 8:
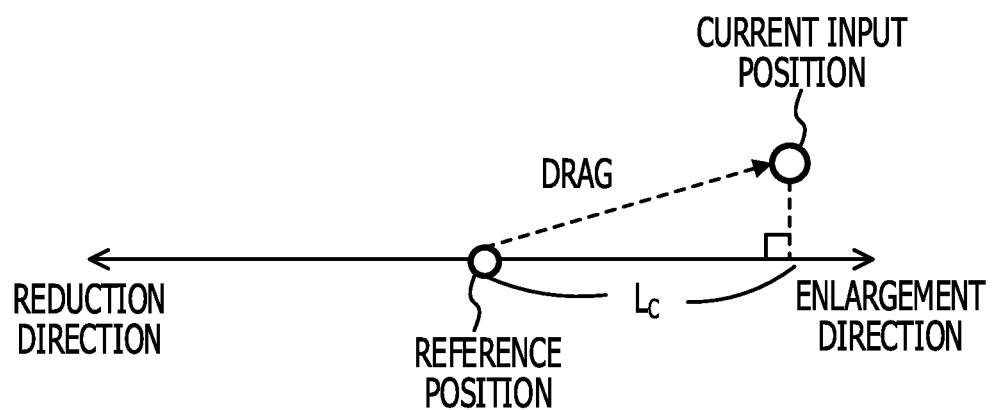
FIG. 8 is a diagram for explaining a relationship between a movement amount due to drag and a zoom factor.

Here, a relationship between a movement amount due to drag and a zoom factor will be described using drawings. FIG. 8 is a diagram for explaining a relationship between a movement amount due to drag and a zoom factor.

A relational expression between a movement amount due to drag from the reference position and a zoom factor in the present embodiment may be defined as, for example, "Enlargement Zoom Factor=$(L_C+C)/C \times S_D$" or "Reduction Zoom Factor=$C/(L_C+C) \times S_D$". Here, the C, the $L_C$, and the $S_D$ indicate a given number, a distance between a point projected in the axis direction of enlargement or reduction and the reference position, and a zoom factor shortly before a transition to the zoom mode, respectively.

In other words, in the example of FIG. 8, an enlargement direction and a reduction direction are preliminarily set with respect to the reference position, and when a drag operation has been performed from the reference position to a current input point at the time of the zoom mode, first the distance $L_C$ between a point where the current input point is projected in the axis direction of enlargement and the reference position is calculated. Next, in the example of FIG. 8, using the value of the distance $L_C$, the zoom factor $S_D$ shortly before a transition to the zoom mode, and the given number C, an enlargement zoom factor is calculated in accordance with the above-mentioned expression, and enlarged display is performed on a display content on the screen on the basis of the calculated enlargement zoom factor with the reference position as a center.

In addition, while, in the example of FIG. 8, the zoom factor is calculated using a point projected in a horizontal direction (lateral axis direction), the calculation of the zoom factor is not limited to this. In addition to this, for example, when the zoom direction of enlargement or reduction is set in a vertical direction (longitudinal axis direction), the zoom factor may also be calculated on the basis of a distance between a point projected in the vertical direction and the reference position.

In addition, while, in the example of FIG. 8, the zoom factor is calculated on the basis of a distance between a point projected in the axis direction of enlargement or reduction and the reference position, the calculation of the zoom factor is not limited to this. In addition to this, for example, a distance between the reference position and a current input point may be calculated, the calculated distance may be substituted in the $L_C$ in the above-mentioned expression, and the zoom factor of enlargement or reduction may also be calculated. In this case, in the example of FIG. 8, when drag is performed to the right side compared with the reference position, an enlargement zoom factor is calculated, and when drag is performed to the left side compared with the reference position, a reduction zoom factor is calculated.

Furthermore, in the present embodiment, from a relationship between a distance from the reference position corresponding to a tap position to the end of the screen and a preliminarily set maximum (minimum) scaling factor, a scaling factor corresponding to a movement distance may be set. In that case, for example, a distance from the reference position to a screen end corresponding to movement in a certain direction is set as the maximum scaling factor or the minimum scaling factor, and from a relationship between the set distance and a scaling factor, a scaling factor with respect to a certain distance is set.

For example, it is assumed that, in the zoom mode, a drag operation in a left direction from the reference position is set as reduction zoom and a drag operation in a right direction therefrom is set as enlargement zoom. Here, it is assumed that a distance from the reference position to the screen's left end is $L_L$ and a distance therefrom to the screen's right end is $L_R$. In addition, it is assumed that a minimum zoom factor and a maximum zoom factor, which are operable at one time, are $S_{min}$ and $S_{max}$, respectively. At this time, a zoom factor with respect to a display image may be expressed as "Reduction Zoom Factor=$((S_{min}-1)/L_L \times L_C+1) \times S_D$" or "Enlargement Zoom Factor=$((S_{max}-1)/L_R \times L_C+1) \times S_P$". In addition, the $L_C$ indicates a distance between a point projected in the axis direction of enlargement or reduction and the reference position, and the $S_D$ indicates a zoom factor shortly before a transition to the zoom mode. Accordingly, it may be possible to realize a maximum scaling factor or a minimum scaling factor, preliminarily set using a distance from the reference position to an end portion.

<Relationship between Drag Direction and Enlargement or Reduction Zoom>

Here, a relationship between a drag direction and enlargement or reduction zoom in the present embodiment will be described. In the present embodiment, while, as for in which direction drag is performed with respect to the reference position at the time of the zoom mode to perform the change of a display content due to enlargement or reduction, a setting may be preliminarily performed with being caused to have a fixed direction in which enlargement or reduction is performed or a certain direction angular range, an embodiment is not limited to this.

For example, in the present embodiment, it may be determined whether or not the reference position where zoom is performed is located in the vicinity of a screen end, and when the reference position is located in the vicinity of the screen end, a direction in which the zoom operation due to drag is performed may be dynamically changed. In addition, while the vicinity indicates, for example, a region where a distance from the screen end falls within a certain distance (for example, about 1 cm), the vicinity is not limited to this, and the certain distance may be arbitrarily set so as to correspond to, for example, a screen size or the like.

For example, in a case where it is assumed that a drag operation in a left direction from the reference position is preliminarily set as the reduction zoom and a drag operation in a right direction from the reference position is preliminarily set as the enlargement zoom, when the reference position is located in the vicinity of the screen's left end, it may be difficult to perform a drag operation (reduction zoom) to the left side. In this case, in the present embodiment, a drag direction in which the reduction zoom is performed is reset to an upward direction or an downward direction. In addition, since it may be possible to perform a drag operation (enlargement zoom) with respect to the right direction when the reference position is located in the vicinity of the screen's left end, the change of the drag direction of the enlargement zoom may not be performed. In other words, in the above-mentioned example, which of right and left screen ends the reference position on the screen is located in the vicinity of is examined. In addition, a drag direction used for reduction is reset to the upward direction or the downward direction in the case of the vicinity of the left end, and a drag direction used for enlargement is reset to the upward direction or the downward direction in the case of the vicinity of the right end.

In addition, the reference position on the screen is not limited to the vicinity of the right or left screen end. In addition, for example, when a drag direction used for performing enlargement or reduction is set in the upward and downward directions with respect to the reference position, whether the reference position is located in the vicinity of a top or bottom screen end is examined, and a drag direction is changed when the reference position is located in the vicinity. The above-mentioned determination of whether being located in the vicinity of a screen end may be easily understood on the basis of the position coordinates of the reference position. As described above, by dynamically changing the direction in which the zoom operation is performed, it may be possible for the user to cause display content to be changed using a simpler operation.

SECOND SPECIFIC EXAMPLE

Figure 9A:
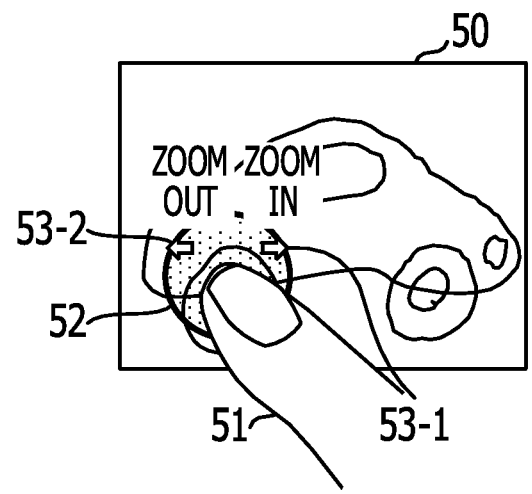
FIG. 9A, FIG. 9B, and FIG. 9C are diagrams illustrating a second specific example of a display content corresponding to a user operation.
Figure 9B:
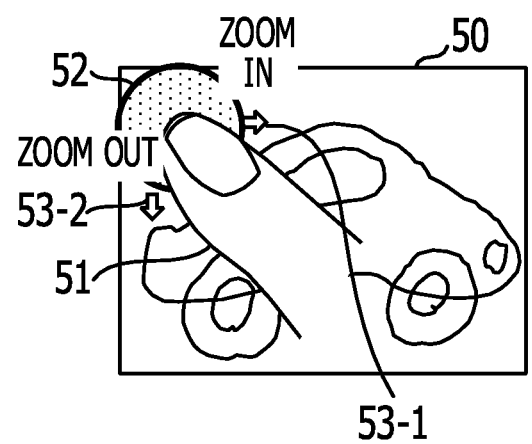
Figure 9C:
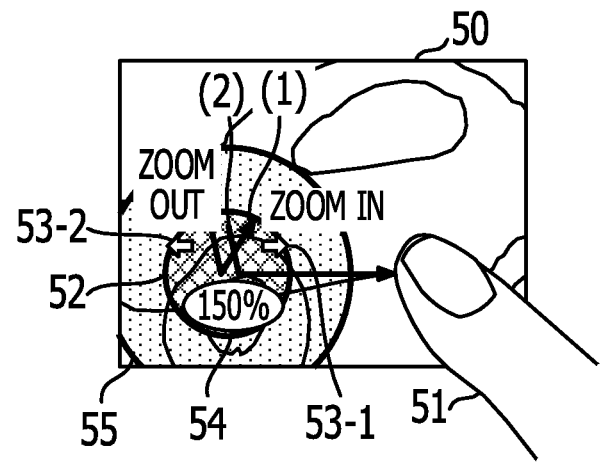

FIG. 9A, FIG. 9B and FIG. 9C are diagrams illustrating a second specific example of a display content corresponding to a user operation. In addition, as described above, arrows (1) and (2) illustrated in FIG. 9C indicate the details of an operation on the screen 50, which utilizes the finger 51 of the user.

In the second specific example, owing to user operations illustrated in FIG. 9A to FIG. 9C, the change of a display content due to the zoom mode is performed. In addition, in the second specific example, the above-mentioned guide display is performed at the time of the zoom mode.

In FIG. 9A, for example, a state is illustrated where the finger 51 of the user taps on the screen 50 twice within a certain time and after the tap, the finger 51 keeps being in contact with the screen 50. In this case, while, in the present embodiment, a change from the normal mode to the zoom mode occurs, guide display is performed on the screen 50 in the second specific example. Owing to this guide display, it may be possible for the user to easily understand the change to the zoom mode.

In addition, the guide display illustrated in FIG. 9A includes a reference mark 52 corresponding to a size (zoom factor) before a transition to the zoom mode. In addition, the guide display illustrated in FIG. 9A includes a direction mark 53-1 indicating a direction for performing the enlargement zoom (Zoom In) or a direction mark 53-2 indicating a direction for performing the reduction zoom (Zoom Out).

While the reference mark 52 illustrated in FIG. 9A is displayed in a circular shape, and furthermore, a certain color, a patter, and the like, which are semi-transparent, are attached within the circular shape, the shape, the color, the patter, and the like are not limited to these. For example, as for the shape, a star shape, a square shape, a shape reduced in response to an image size (outer shape), a triangular shape, a certain character mark, or the like may be cited. In addition, as for the color, the outer peripheral portion of the reference mark 52 may only be displayed with a certain color, and the inside of the reference mark 52 may also be transparent.

In addition, while, as the direction marks 53-1 and 53-2 illustrated in FIG. 9A, arrows indicating drag directions and display contents (for example, "Zoom In" and "Zoom Out") due to movement in the directions of the arrows are illustrated, the direction marks 53-1 and 53-2 are not limited to these.

Here, in the example of FIG. 9A, a drag direction in which is enlargement or reduction is performed is preliminarily set in a right or left direction with respect to the reference position. However, when, as described above, the reference position is located in the vicinity of a screen end, the drag direction is reset, and a direction mark is displayed in the reset drag direction. For example, in the example of FIG. 9B, when the user has tapped an upper left position within the screen 50 twice using the finger 51 and the display mode has been put into the zoom mode, the reference position is located in the vicinity of the end portion of the screen 50. Therefore, it may be difficult to perform a drag operation in the left direction. Therefore, in the present embodiment, the reduction zoom set in the left direction is reset to a direction different from the right direction that has already been set in the enlargement zoom. In addition, while, as a candidate for the direction of the resetting, there are upward and downward directions, as for the upward direction, the reference position is also located in the vicinity of the end portion of the screen 50. Therefore, it may be difficult to perform a drag operation. Accordingly, the reduction zoom is reset to the downward direction, and as illustrated in FIG. 9B, the direction mark of the reduction zoom (Zoom Out) is displayed in the downward direction.

Furthermore, in the second specific example, as the guide display, as illustrated in FIG. 9C, a zoom factor 54 may also be displayed that indicates how much ratio a display content is enlarged or reduced with, in response to a movement distance due to a drag operation. The example of FIG. 9C illustrates that the display of target data is enlarged with a zoom factor 150% owing to a drag operation at the present moment. In addition, as illustrated in FIG. 9C, the zoom factor 54 may also be displayed near the reference position, and may also be displayed at a certain position such as a certain position in the screen 50 (for example, the upper right or the center of the screen 50).

In addition, in the second specific example, as illustrated in FIG. 9C, as the guide display, a zoom mark 55 may also be displayed that indicates to what extent the display content has been changed during drag. In addition, the zoom mark 55 has a shape similar to the reference mark 52, and is enlarged or reduced to be displayed with the reference position as a reference. In other words, the zoom mark 55 is a mark obtained by enlarging or reducing and displaying the reference mark 52 so that the reference mark 52 corresponds to, for example, the value of the zoom factor 54.

Accordingly, when, at the time of the zoom mode, the zoom factor does not change from a state before the zoom mode (the zoom factor=100%), the reference mark 52 and the zoom mark 55 are superimposed and displayed with the same shape. In addition, in the case of the enlargement zoom, as illustrated in FIG. 9C, the zoom mark 55 is displayed on the outer side of the reference mark 52 so as to correspond to a distance from the reference position, due to a drag operation. In addition, in the case of the reduction zoom, the zoom mark 55 is superimposed and displayed on the inner side of the reference mark 52 so as to correspond to a distance from the reference position, due to a drag operation.

In addition, a certain color, a patter, and the like, which are semi-transparent and different from the reference mark 52, are attached within the zoom mark 55, and the outer peripheral portion of the zoom mark 55 may only be displayed with a certain color. In addition, while the reference mark 52 and the zoom mark 55 are superimposed and displayed, it is desirable that both thereof are simultaneously visible by, for example, only outlining or making one thereof semi-transparent or superimposing and displaying a smaller mark. By doing so, in the present embodiment, since the zoom factor changes so as to follow the motion of a finger, and a current zoom factor also becomes easily visually understandable, it may be possible for the user to intuitively perform a zoom operation.

Here, the size of the reference mark 52 may be acquired using the above-mentioned calculation expression of the enlargement zoom factor (for example, Enlargement Zoom Factor=$(L_C+C)/C \times S_D$) or the above-mentioned calculation expression of the reduction zoom factor (for example, Reduction Zoom Factor=$C/(L_C+C) \times S_D$). For example, it is assumed that the size of the reference mark 52 has the same size of a circle whose radius is the given number C in the above-mentioned expression and the center of the position thereof is the reference position. In addition, the center of the position of the zoom mark 55 may be the reference position, and the size of the zoom mark 55 may be defined as, for example, "Size of Reference Mark 52×Zoom Factor/$S_D$".

THIRD SPECIFIC EXAMPLE

Figure 10A:
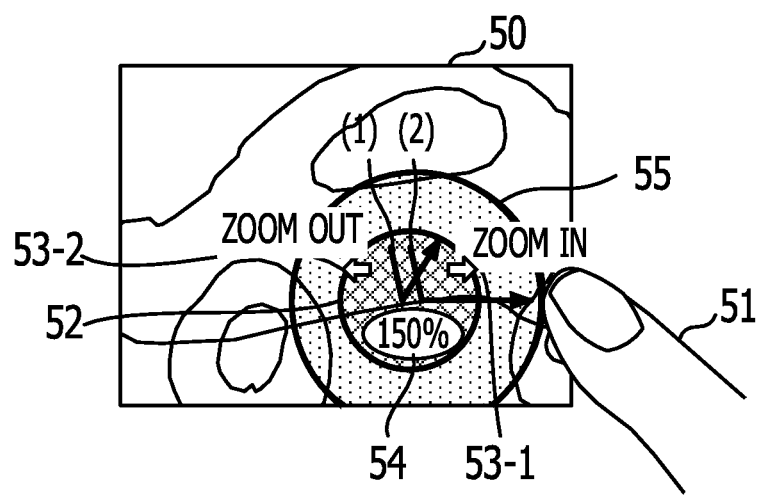
FIG. 10A and FIG. 10B are diagrams illustrating a third specific example of a display content corresponding to a user operation.
Figure 10B:
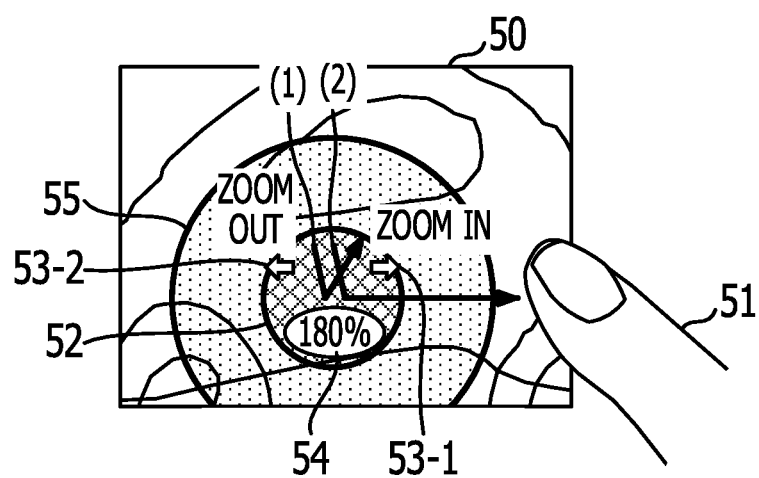

FIG. 10A and FIG. 10B are diagrams illustrating a third specific example of a display content corresponding to a user operation. In addition, as described above, arrows (1) and (2) illustrated in FIG. 10A and FIG. 10B indicate the details of an operation on the screen 50, which utilizes the finger 51 of the user. In the third specific example, at the time of the zoom mode, the change of a display content is illustrated when the finger 51 of the user stays in the end of the screen. Specifically, when a current input position due to, for example, a drag input is located in the vicinity of a screen end (for example, within about 1 cm from the screen end), and the staying of a certain time has occurred at the position, scrolling is performed in a direction in which the reference position moves away from the current input position.

For example, in the third specific example, it is assumed that, owing to the operations of the arrows (1) and (2) due to the finger 51 of the user, the display mode is put from the normal mode into the zoom mode and furthermore, owing to a drag operation illustrated in the arrow (2), the finger 51 of the user has moved to the vicinity of the right end of the screen 50.

At this time, in the third specific example, by staying the finger 51 of the user in the vicinity of the end of the screen 50 only during a certain time (for example, about 1 second to 2 seconds), the screen 50 is scrolled in a left-side direction as illustrated in FIG. 10B. In addition, in the third specific example, owing to the above-mentioned scrolling, the drag operation of the finger 51 is continued, and in response to the continued drag operation, the zoom factor is changed as illustrated in FIG. 10B. In addition, in the third specific example, when the finger 51 is moved away from the screen at the time of the above-mentioned scrolling, the scrolling is halted.

In addition, a scrolling direction is set on the basis of the direction or the position of the finger 51 performing the drag operation. In the third specific example, so as to be able to continue a drag operation even if the finger 51 performing the drag operation in a certain direction has moved to the end portion of the screen 50, scrolling is performed in a direction opposite to the drag direction, by causing the finger 51 to stay during the certain time. In addition, as for the scrolling performed in a direction opposite to the drag direction, scrolling turns out to be performed in, for example, a direction in which the reference position is moved away from a current input position. Accordingly, in the third specific example, it may be possible to continue the drag operation along with the scroll operation.

In the examples of FIG. 10A and FIG. 10B, the zoom factor is 150% in a state where the finger 51 has been moved to the end of the screen 50 owing to the drag operation at the time of the zoom mode. In addition, after that, by causing the finger 51 to stay only during the certain time, the screen 50 is scrolled, and the zoom factor is also changed to 180%.

In addition, while, in the above-mentioned example of a screen, a display content is also changed and displayed in real time in accordance with the displayed zoom factor, the display content is not limited to this. For example, in the third specific example, when a drag operation has been performed at the time of the zoom mode, the finger 51 has been moved away from the screen 50 at a certain zoom factor, and the zoom mode has been cancelled, the display content may also be changed to zoom display corresponding to that zoom factor.

FOURTH SPECIFIC EXAMPLE

FIG. 11A, FIG. 11B, and FIG. 11C and FIG. 11D are diagrams illustrating a fourth specific example of a display content corresponding to a user operation. In addition, as described above, arrows (1) and (2) illustrated in FIG. 11A to FIG. 11C indicate the details of an operation on the screen 50, which utilizes the finger 51 of the user. In addition, an arrow (3) illustrated in FIG. 11C indicates an operation where, after, using the finger 51 of the user, drag has been performed in a certain direction away from the reference position, the direction being based on the arrow (2), circular arc-shaped rotational movement is performed with the reference position as a center while continuing the drag operation. In addition, the arrow (3) is not displayed in the actual screen 50. In other words, the fourth specific example illustrates an example where, at the time of the zoom mode, by causing the finger 51 of the user to be subjected to the circular arc-shaped rotational movement while the screen 50 is being dragged using the finger 51 of the user, a transition from the zoom mode to the above-mentioned rotation mode occurs.

Figure 11A:
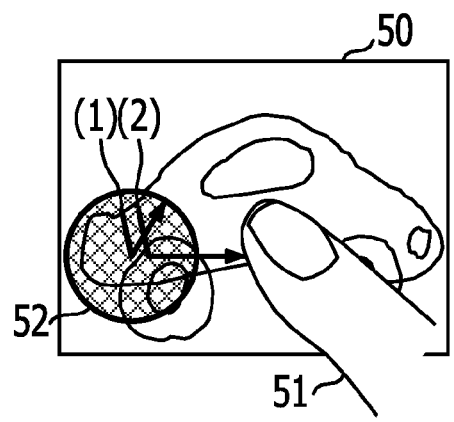
FIG. 11A, FIG. 11B, FIG. 11C, and FIG. 11D are diagrams illustrating a fourth specific example of a display content corresponding to a user operation.

For example, in the fourth specific example, as illustrated in FIG. 11A, owing to the operations of the arrows (1) and (2) utilizing the finger 51 of the user, the screen 50 is quickly tapped twice during a certain time, a drag operation is performed without change, and hence, the display mode is put from the normal mode into the zoom mode. In addition, while, in the example of FIG. 11A, the above-mentioned reference mark 52 is displayed as guide display, the guide display is not limited to this, the above-mentioned direction mark may also be displayed, for example, and there may not be the guide display.

Figure 11B:
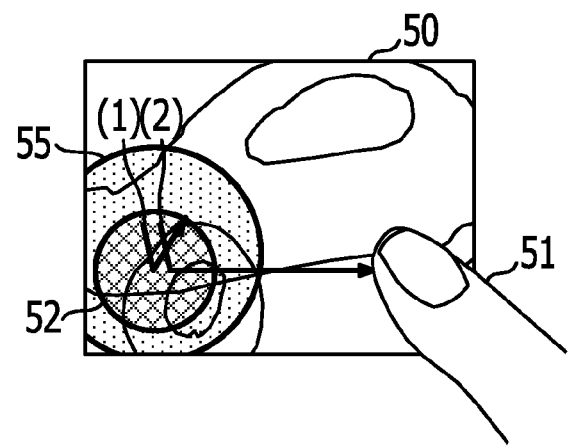

In addition, in the fourth specific example, as illustrated in FIG. 11B, by performing a drag operation in a certain direction of moving away from the reference position corresponding to a tap position, enlarged display according to a distance from the reference position is performed. In addition, while, in the example of FIG. 11B, the reference mark 52 and the zoom mark 55, described above, are displayed as guide display, the guide display is not limited to this, and there may not be the guide display.

Figure 11C:
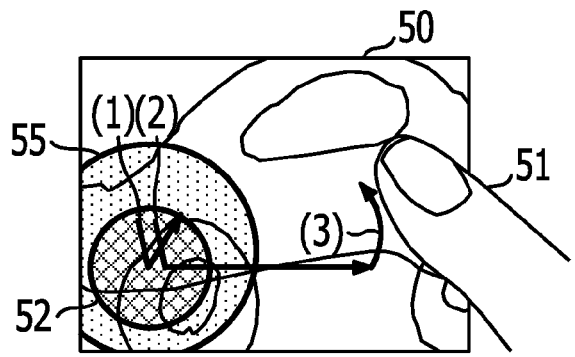
Figure 11D:
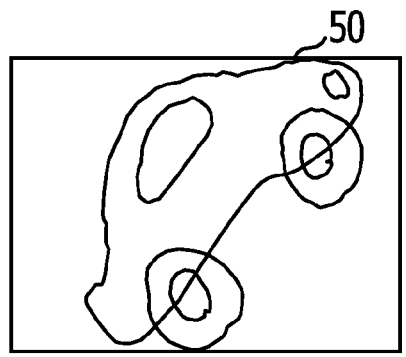

Here, in the fourth specific example, as illustrated in the arrow (3) in FIG. 11C, by moving the finger 51 in a circular arc shape by a certain amount or more, a transition from the zoom mode to the rotation mode occurs. In addition, in the fourth specific example, in accordance with a direction and a movement amount where rotational movement due to the arrow (3) is performed, the display content (target data) of the screen 50 is rotated as illustrated in FIG. 11D. In addition, while, in the example of FIG. 11D, target data to be rotated is rotated in a certain direction after having been returned to a state before zoom, the target data is not limited to this, and may also be rotated with remaining in a state of being subjected to zoom display owing to the operation of FIG. 11B. In addition, in the fourth specific example, for example, as illustrated in FIG. 11A, the operation of the arrow (3) illustrated in FIG. 11C may be performed shortly after movement to the zoom mode, and hence, the display mode may also be put into the rotation mode. As illustrated in the fourth specific example, in the present embodiment, it may be possible to adequately change a display content owing to the simple operation of the user.

In addition, at the time of the rotation mode illustrated in the fourth specific example, the above-mentioned third specific example may also be applied. Specifically, for example, when a current input position (pointing position) due to the finger 51 of the user is located in the vicinity of a screen end and the staying of a certain time occurs, a certain amount of scrolling may be performed in a direction in which the reference position moves away from the current input position.

FIFTH SPECIFIC EXAMPLE

FIG. 12A, FIG. 12B, FIG. 12C and FIG. 12D are diagrams illustrating a fifth specific example of a display content corresponding to a user operation. In addition, as described above, arrows (1) and (2) illustrated in FIG. 12A to FIG. 12C indicate the details of an operation on the screen 50, which utilizes the finger 51 of the user. In addition, an arrow (3) illustrated in FIG. 12C indicates an operation where, after, using the finger 51 of the user, drag has been performed in a certain direction away from the reference position, the direction being based on the arrow (2), the finger 51 of the user moves in a direction different from the movement direction corresponding to the zoom mode or the rotation mode while continuing the drag operation. In other words, in the fifth specific example, owing to the operation of the arrow (3), the previous content of an operation is cancelled, and original target data before a mode transition is displayed. In addition, the arrow (3) is not displayed in the actual screen 50.

Figure 12A:
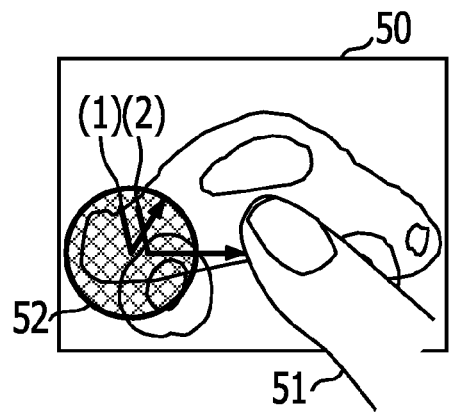
FIG. 12A, FIG. 12B, FIG. 12C, and FIG. 12D are diagrams illustrating a fifth specific example of a display content corresponding to a user operation.

For example, in the fifth specific example, as illustrated in FIG. 12A, owing to the operations of the arrows (1) and (2) utilizing the finger 51 of the user, the screen 50 is quickly tapped twice during a certain time, a drag operation is performed without change, and hence, the display mode is put from the normal mode into the zoom mode. In addition, while, in the example of FIG. 12A, the above-mentioned reference mark 52 is displayed as guide display, the guide display is not limited to this, the above-mentioned direction mark may also be displayed, for example, and there may not be the guide display.

Figure 12B:
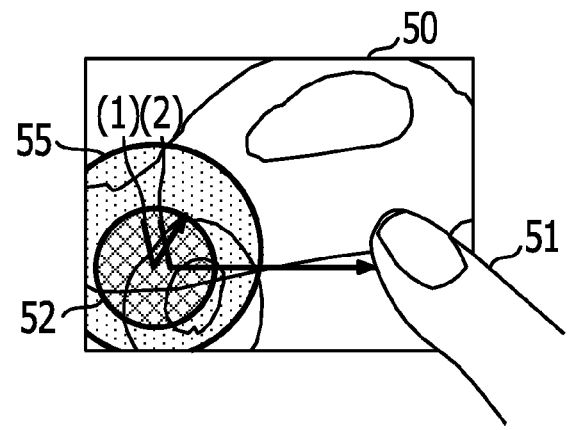

In addition, in the fifth specific example, as illustrated in FIG. 12B, by performing a drag operation in a direction of moving away from the reference position corresponding to a tap position, enlarged display according to a distance from the reference position is performed. In addition, while, in the example of FIG. 12B, the reference mark 52 and the zoom mark 55, described above, are displayed as guide display, the guide display is not limited to this, and there may not be the guide display.

Figure 12C:
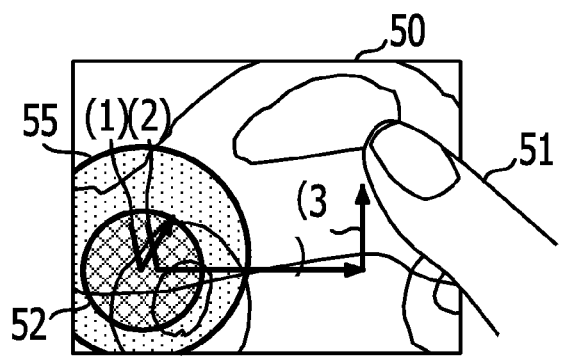
Figure 12D:
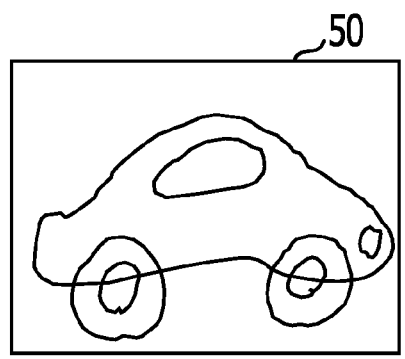

Here, in the fifth specific example, as illustrated in the arrow (3) in FIG. 12C, by moving the finger 51 in the upward direction of the screen 50 by a certain amount or more, the zoom mode is cancelled, and as illustrated in FIG. 12D, the display content (target data) before a mode transition is displayed in the screen 50. In addition, in the present embodiment, a direction for cancelling is preliminarily set, and by performing the drag operation in the set direction, it may be possible to realize the above-mentioned cancel operation. In this case, as the direction for cancelling, a direction is set that is different from the direction in which the zoom mode, the rotation mode, or the like is performed.

In addition, in the fifth specific example, for example, as illustrated in FIG. 12A, the operation of the arrow (3) illustrated in FIG. 12C is performed shortly after movement to the zoom mode, and it may be possible to cancel a mode transition. As illustrated in the fifth specific example, in the present embodiment, it may be possible to adequately change a display content owing to the simple operation of the user.

In addition, the mode transition in each of the above-mentioned specific examples is controlled by the mode controller 18. In addition, in each of the specific examples, so as to correspond to a mode controlled by the mode controller 18, a display content is changed on the basis of the amounts of change (a zoom factor and a rotation angle) or the like obtained by the change amount calculation unit 20 or a setting content obtained the display content setting unit 21. In addition, a plurality of the above-mentioned individual specific examples may be combined to change the display content of the screen 50.

According to the above-mentioned embodiments, it may be possible to adequately change the display content of a screen owing to a simple operation. Specifically, according to the present embodiment, the position input unit performs two or more position inputs within a given period of time and a given distance, and a drag operation is continuously performed without change. Accordingly, it may become possible for a zoom factor to be changed so as to follow a drag amount with a reference position as a center, the reference position corresponding to a tap position. Therefore, according to the present embodiment, it may be possible to specify the reference position and the zoom factor at one time, and, for example, using the thumb of one hand or the like, it may become possible to easily zoom a display content (target data) on the basis of an arbitrary scaling factor, compared with a method of the related art. In addition, according to the present embodiment, it may also be possible to specify the reference position and the rotation angle at one time, and, for example, using the thumb of one hand or the like, it may become possible to easily rotate a display content on the basis of an arbitrary rotation angle, compared with a method of the related art. Furthermore, since the operation in the present embodiment does not overlap with another general touch operation, it may be possible for the user to perform the intended change of a display content without being confused.

While so far each embodiment has been described in detail, the disclosed technology is not limited to a specific embodiment, and in addition to the above-mentioned examples of a modification to an embodiment, various modifications and various alterations may occur as they are within a scope described in the claims.

What is claimed is:

1. A display method comprising:
receiving a first input relating to a first operation performed on a display content displayed in a display;
receiving a second input relating to a second operation performed on the display content after the first operation; and
when an elapsed time since a start of the first operation is less than a threshold and the second operation is a drag operation, changing, by a processor, a display scaling factor of the display content based on a movement direction of the drag operation and a distance between a reference position relating to at least one of the first input and the second input, and a current position of the drag operation.

2. The display method according to claim 1, further comprising:
calculating a movement distance of an input position during continuation of the second input; and
based on the movement distance, determining whether or not the second input is the drag operation.

3. The display method according to claim 2, further comprising:
counting a frequency of input operations relating to operations performed on the display content,
wherein, when the frequency is greater than or equal to two and the movement distance is greater than or equal to a threshold value, the changing of the display scaling factor is executed.

4. The display method according to claim 3, further comprising:
scrolling the display content when the frequency is one.

5. The display method according to claim 1, wherein the reference position is an average coordinate of a plurality of coordinates input by the first input and the second input or at least one coordinate of the plurality of coordinates.

6. The display method according to claim 1, further comprising:
calculating the display scaling factor based on a value obtained by linearly transforming the distance between the reference position and the current position in a certain axis direction,
wherein the changing enlarges or reduces the display content based on the display scaling factor.

7. The display method according to claim 1, further comprising:
during continuation of the drag operation relating to the second input, performing, in the display unit, guide display that indicates a first direction in which the display content is enlarged and a second direction in which the display content is reduced.

8. The display method according to claim 1, further comprising:
cancelling the changing of the display scaling factor when the movement direction of the drag operation has been changed from one of a first direction in which the display content is enlarged and a second direction in which the display content is reduced to another direction during continuation of the second input.

9. The display method according to claim 1, further comprising:
receiving a third input relating to a third operation performed on the display content; and
rotating the display content when the third input is another drag operation different from the drag operation, the another drag operation indicating circular arc-shaped movement.

10. The display method according to claim 1, wherein:
the display includes a touch panel,
the first operation includes a first depress operation to the touch panel and a release operation from the touch panel occurring subsequent to the first press operation, the first depress operation being an operation for the start of the first operation, and
the second operation includes a second depress operation to the touch panel occurring subsequent to the release operation, the second depress operation being an operation for a start of the drag operation.

11. The display method according to claim 1, wherein the elapsed time is a time since the start of the first operation to a time relating to performance of the second operation.

12. A non-transitory computer-readable recording medium storing a display program for causing a computer to execute a process, the process comprising:
receiving a first input relating to a first operation performed on a display content displayed in a display;
receiving a second input relating to a second operation performed on the display content after the first operation; and
when an elapsed time since a start of the first operation is less than a threshold and the second operation is a drag operation, changing a display scaling factor of the display content based on a movement direction of the drag operation and a distance between a reference position relating to at least one of the first input and the second input, and a current position of the drag operation.

13. The non-transitory computer-readable recording medium according to claim 12, wherein the elapsed time is a time since the start of the first operation to a time relating to performance of the second operation.

14. An information processing device comprising:
a memory; and
a processor coupled to the memory and configured to
receive a first input relating to a first operation performed on a display content displayed in a display and a second input relating to a second operation performed on the display content after the first operation, and
when an elapsed time since a start of the first operation is less than a threshold and the second operation is a drag operation, change a display scaling factor of the display content based on a movement direction of the drag operation and a distance between a reference position relating to at least one of the first input and the second input, and a current position of the drag operation.

15. The information processing device according to claim 14, wherein the processor is further configured to
calculate a movement distance of an input position during continuation of the second input, and
determine whether or not the second input is the drag operation, based on the movement distance.

16. The information processing device according to claim 15, wherein the processor is further configured to
count the frequency of inputs relating to operations performed on the display content, and,
when the frequency is greater than or equal to two and the movement distance is greater than or equal to a threshold value, executing the changing of the display scaling factor.

17. The information processing device according to claim 16, wherein the processor is further configured to scroll the display content when the frequency is less than two.

18. The information processing device according to claim 14, wherein the reference position is an average coordinate of a plurality of coordinates input by the first input and the second input or at least one coordinate of the plurality of coordinates.

19. The information processing device according to claim 14, wherein the processor is further configured to calculate the display scaling factor based on a value obtained by linearly transforming the distance between the reference position and the current position in a certain axis direction, and enlarge or reduce the display content based on the display scaling factor.

20. The information processing device according to claim 14, wherein the elapsed time is a time since the start of the first operation to a time related to performance of the second operation.

21. A display method comprising:
scrolling a display content on a display when a drag operation is performed on the display after a tap operation performed on the display, while changing, by a processor, a display scaling factor of the display content when the drag operation is performed after the tap operation and an elapsed time since the tap operation is less than a threshold.

22. The display method according to claim 21, wherein the elapsed time is a time from the tap operation to the drag operation.

23. A display method comprising:
scrolling a display content on a display according to a drag operation performed on the display when an elapsed time since a tap operation performed on the display is equal to or greater than a threshold; and
changing, by a processor, a display scaling factor of the display content according to the drag operation when the elapsed time is less than the threshold.

24. The display method according to claim 23, wherein the elapsed time is a time from the tap operation to a time related to performance of the drag operation.

25. A display method comprising:
when a tap operation and a drag operation performed after the tap operation are detected, setting, by a processor, one of a first mode in which a display content is scrolled and a second mode in which a display scaling factor of the display content is changed, based on an elapsed time since the tap operation; and
displaying the display content on the display in response to the drag operation, in accordance with the one of the first mode and the second mode set by the setting.

26. The display method according to claim 25, wherein the elapsed time is a time from the tap operation to a time related to performance of the drag operation.

* * * * *

UNITED STATES PATENT AND TRADEMARK OFFICE
CERTIFICATE OF CORRECTION

| | | |
|---|---|---|
| PATENT NO. | : 9,134,801 B2 | Page 1 of 1 |
| APPLICATION NO. | : 13/910546 | |
| DATED | : September 15, 2015 | |
| INVENTOR(S) | : Akiyama | |

It is certified that error appears in the above-identified patent and that said Letters Patent is hereby corrected as shown below:

In the claims

Claim 7, Column 24, Line 48

After "display" delete "unit".

Signed and Sealed this
Eighth Day of December, 2015

Michelle K. Lee
*Director of the United States Patent and Trademark Office*